United States Patent [19]

Takano et al.

[11] Patent Number: 5,778,267
[45] Date of Patent: Jul. 7, 1998

[54] FILM FEED CONTROL APPARATUS

[75] Inventors: Tetsuya Takano, Warabi; Norikazu Yokonuma, Yokohama; Hideo Hibino, Kawasaki; Kazuyuki Kazami, Tokyo; Hisashi Okutsu, Yokohama, all of Japan

[73] Assignee: Nikon Corporation, Tokyo, Japan

[21] Appl. No.: 545,344

[22] Filed: Oct. 19, 1995

[30] Foreign Application Priority Data

Oct. 20, 1994 [JP] Japan ..................... 6-255341
Oct. 26, 1994 [JP] Japan ..................... 6-262279

[51] Int. Cl.$^6$ .................... G03B 17/24; G03B 19/02
[52] U.S. Cl. ..................... 396/319; 396/320; 396/389
[58] Field of Search ................... 354/173.1, 173.11, 354/105, 106; 396/389, 390, 392, 404, 319, 320, 310

[56] References Cited

U.S. PATENT DOCUMENTS

| | | | |
|---|---|---|---|
| 4,864,332 | 9/1989 | Harvey | 354/21 |
| 4,878,075 | 10/1989 | Cannon | 354/173.1 |
| 4,980,709 | 12/1990 | Cocca | 354/173.1 |
| 5,107,290 | 4/1992 | Ohsawa | 354/173.1 |
| 5,113,208 | 5/1992 | Stoneham et al. | 354/105 |
| 5,247,321 | 9/1993 | Kazami | 354/106 |
| 5,302,986 | 4/1994 | Kazami | 354/21 |
| 5,345,286 | 9/1994 | Stiehler | 534/173.1 |
| 5,416,546 | 5/1995 | Izukawa | 354/106 |
| 5,504,546 | 4/1996 | Kazami et al. | 534/106 |
| 5,530,501 | 6/1996 | Bell | 354/106 |
| 5,612,757 | 3/1997 | Amano | 396/319 |
| 5,634,158 | 5/1997 | Shon et al. | 396/320 |

FOREIGN PATENT DOCUMENTS

A-4-328536  11/1992  Japan.

*Primary Examiner*—Safet Metjahic
*Assistant Examiner*—Christopher E. Mahoney
*Attorney, Agent, or Firm*—Oliff & Berridge, PLC

[57] ABSTRACT

The film feed control apparatus performs frame feed operation in which a photographic film is fed in a specific direction when a given photographic frame of the photographic film is being set at a specific position, and the photographic film is stopped when a next photographic frame is set at the specific position. The film feed control apparatus is provided with a feed device that feeds the film, and a control device that controls the feed device in such a manner that, when an unfinished film, which includes exposed frames and unexposed frames, is loaded, stops the film if an unexposed frame is set at the specific position while the unfinished film is being fed in the specific direction, which is the same as the direction of film feed during the frame feed operation.

17 Claims, 29 Drawing Sheets

DIRECTION OF WIND UP ←

FIG. 23A DIRECTION OF WIND UP

PRIOR ART

FILM FEED CONTROL APPARATUS

BACKGROUND OF THE INVENTION

1. Field of the Invention

The present invention relates to a film feed control apparatus provided in a camera or the like.

2. Description of the Related Art

There are cameras in the known art that detect the perforations in photographic film and perform film feed control and control of magnetic recording on to the film based upon the results of the perforation detection (see Japanese Patent Laid-Open Publication Serial No. Heisei 4-328536, for instance). This type of camera is provided with a magnetic recording/reproducing device and, during film feed, records information on to areas (magnetic recording areas) corresponding to individual photographic frames, in a magnetic track that extends along the direction of the length of the film. For instance, if photographic information is recorded for each photographic frame of the film at the time of photographing, it is possible to take the unfinished film (the film having exposed frames and unexposed frames) out of the camera, and then to reload the same film into the camera to continue photographing the unexposed frames. To give a more detailed account of this: when an unfinished film cartridge is loaded in the cartridge chamber, the information recorded for each photographic frame is reproduced by the magnetic recording/reproducing device while winding up the film and the first photographic frame for which information is not recorded is detected. This photographic frame is thus recognized as the first unexposed frame, and this first unexposed frame is set at the photographing position.

Normally, after a photographic frame is exposed, the film is wound up by only one frame, to set the next photographic frame at the photographing position (the position facing opposite the aperture) and during the wind up operation by one frame (frame feed operation), information for the photographic frame that has just been exposed is recorded in the magnetic recording area. However, in such a structure, if an unexposed frame is detected through a reproducing operation of the magnetic recording/reproducing device during wind up after an unfinished film is reloaded, this unexposed frame will already have passed the photographing position. Therefore, the wind up must be stopped and then the film must be wound back to set the unexposed frame at the photographing position. Thus, the direction of film feed performed when an unexposed frame is detected and set at the photographing position is the reverse of that performed when film is wound up by one frame after photographing to set the next frame at the photographing position, and this presents the following problem:

Normally, in order to set a photographic frame of film at the photographing position, the film is fed at low speed and the film feed is stopped when a specific perforation is detected. However, a slight overshoot is to be expected in such a mechanism, and in that case, a difference occurs between the actual position of the photographic frame and the photographing position, and the direction of this difference is reversed if the direction of film feed performed when setting a photographic frame at the photographing position is reversed. As a result, the space between the unexposed frame that is first set at the photographing position after an unfinished film is reloaded, and the exposed film that was set last at the photographing position through wind up before the film was taken out unfinished, is extremely small and there is the likelihood of those frames overlapping.

In the meanwhile, there are also cameras in the known art that are provided with two perforation detection devices (photo interrupters, for instance) for detecting perforations in film, whereby the recording frequency and the magnetic recording start timing are determined based upon the perforation detection signal from the first detection device and the magnetic recording stop timing and the film feed stop timing are determined based upon the perforation detection signal from the second detection device (see Japanese Patent Laid-Open Publication No. Heisei 4-328536, for instance).

The magnetic recording operation performed by this type of camera in the known art is explained in reference to FIGS. 24A–24E. In the figures, reference numbers 101 and 102 respectively, indicate the position of the first and second perforation detection devices relative to the film, and reference number 103 indicates the magnetic head used for magnetic recording.

(1) FIG. 24A shows the state in which a photographic frame Fn is set at the photographing position. When exposure of the photographic frame Fn is completed at this position, film feed starts in the direction of wind up.

(2) The film feed time elapsing after the leading edge of the perforation PY (the edge on the left in the figure) reaches the detection position 101 of the first photo interrupter, as shown in FIG. 24B, until the trailing edge of the perforation PY (the edge on the right in the figure) reaches the detection position 101, as shown in FIG. 24C, i.e., the time elapsing after the first photo interrupter detects the leading edge of the perforation PY until it detects the trailing edge, is counted by a timer. The film feed speed is calculated based upon this counted time and the length of the perforation PY between the leading edge and the trailing edge. Then, based upon the calculated film feed speed, a magnetic recording frequency that will achieve a specific magnetic recording density is calculated and magnetic recording is started by the magnetic head 103 with a recording signal set to that specific recording frequency.

(3) When the leading edge of the perforation PY reaches the detection position 102 of the second photo interrupter, as shown in FIG. 24D, the magnetic recording operation ends and, at the same time, duty drive of the film feed motor starts to reduce the film feed speed.

(4) When the trailing edge of the perforation PX of the next photographic frame F(n+1) reaches the detection position 102 of the second photo interrupter, as shown in FIG. 24E, film feed stops. At this point, the next photographic frame F(n+1) is set at the photographing position.

When magnetic recording is performed as described above, during the period of time elapsing after the start of wind up until the film feed speed becomes sufficiently stable, and also during the period of time elapsing after the film feed speed is reduced until the wind up stops, a magnetic recording operation would be unstable due to the changing film feed speed. Because of this, it is desirable that magnetic recording is not performed during these two periods of time. However, in the magnetic recording method in the prior art, which has been explained in reference to FIGS. 24A–24E, unless magnetic recording is performed during those two periods of time, the area over which magnetic recording is possible is limited and, as a result, only a small quantity of information can be recorded.

SUMMARY OF THE INVENTION

The object of the present invention is to provide a film feed control apparatus that solves the problem described above by adding an improvement to film feed control.

In order to achieve the object described above, the film feed control apparatus according to the present invention comprises a feed device that feeds film and a control device that controls the feed device in such a manner that, when unfinished film is loaded, the unfinished film is stopped when an unexposed frame arrives at a specific position (a photographic position for instance) while the unfinished film is being fed in the specific direction, which is the same as the direction of film feed during a frame feed operation.

According to the present invention, when unfinished film is loaded, the film is stopped when an unexposed frame is set at a specific position while the unfinished film is being fed in the specific direction, which is the same as the direction of film feed during a frame feed operation. This totally eliminates problems such as the space between photographic frames becoming too small and photographic frames overlapping.

Another film feed control apparatus according to the present invention comprises a feed device that feeds film, a recording device that records information on the film during film feed and a control device that controls the film feed device and the recording device as follows:

The film is fed in a specific direction, and information is recorded in synchronization with the film feed. The film feed in the specific direction continues after a specific portion of the film reaches a specific position. The film is then fed in the opposite direction from the specific direction until the specific portion of the film reaches the specific position.

According to the present invention, information is recorded in synchronization with the film feed, the film feed in the specific direction continues after a specific portion of the film reaches a specific position, and then the film is fed in the opposite direction from the specific direction until the specific portion of the film reaches the specific position. With this, the length of magnetic recording area is increased compared to the prior art, making it possible to record a greater quantity of information.

BRIEF DESCRIPTION OF THE DRAWINGS

FIGS. 23A–23F illustrate a magnetic recording operation performed in the fourth embodiment.

DETAILED DESCRIPTION OF THE PREFERRED EMBODIMENTS

—First Embodiment—

The first embodiment, in which the present invention is applied to a film feed control apparatus in a camera, is explained in reference to FIGS. 1–10B.

Figure 1:
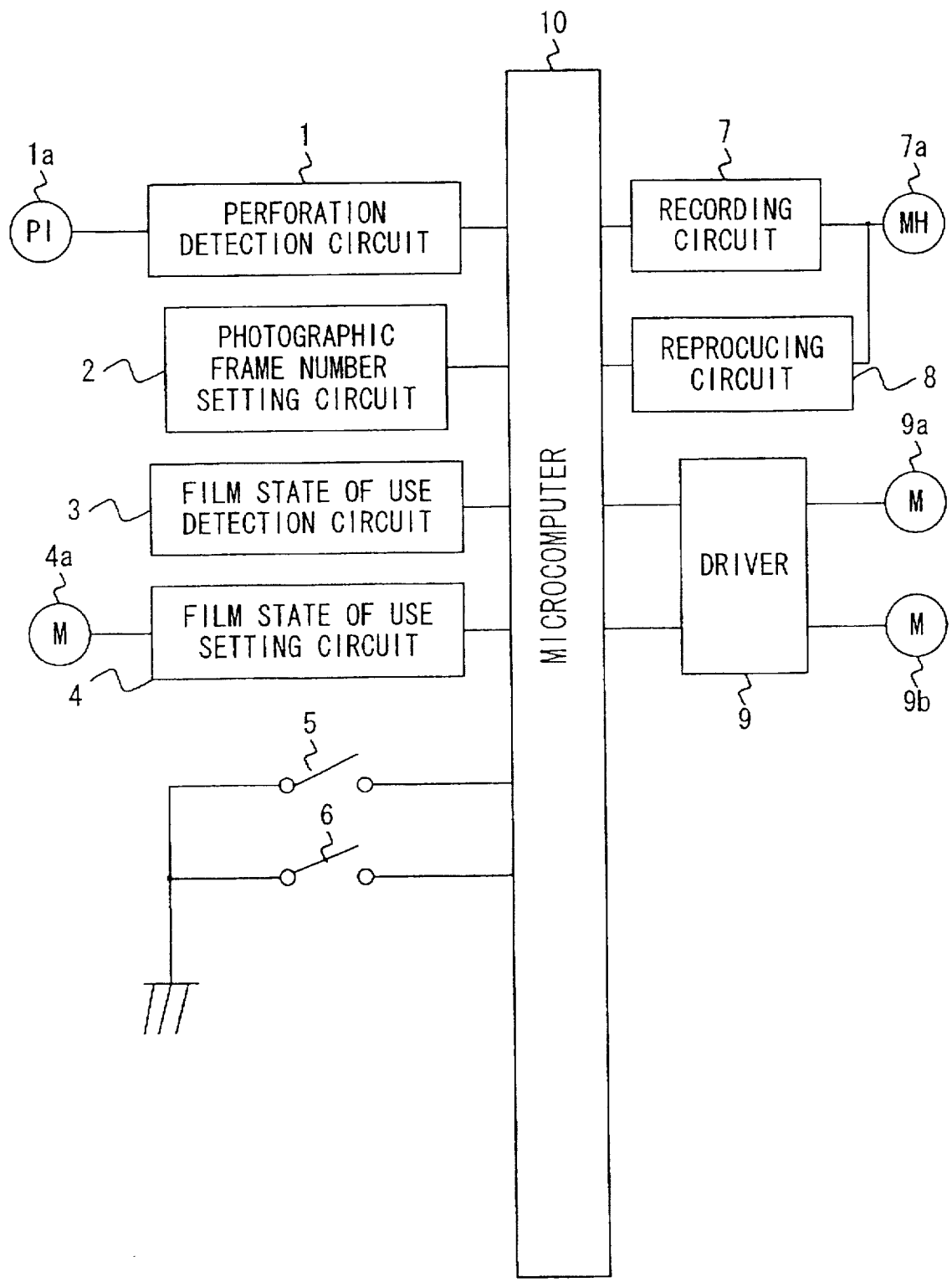
FIG. 1 is a block diagram showing the structure of the control system of the camera in a first embodiment according to the present invention.

FIG. 1 is a block diagram showing the structure of the control system of the camera in this first embodiment according to the present invention. A perforation detection circuit 1 detects perforations of photographic film with a photo interrupter 1a. The photo interrupter 1a is provided with a light emitting portion and a light receiving portion that are positioned across the area where the perforations are formed in the film and the level of the output signal from the light receiving portion changes when the edge of a perforation passes between the light emitting portion and the light receiving portion. As a result, based upon the results of the detection performed by the perforation detection circuit 1, a decision as to whether or not the film is at a specific position (whether or not a specific frame has been set at the photographing position, for instance) can be made. A photographic frame number setting circuit 2 is a circuit that sets a given photographic frame number. The processing for setting the photographic frame number is to be explained later.

A film state of use detection circuit 3 detects the state of film use. The film cartridge is provided with a mechanical indicator system that indicates whether the loaded film is "new film," i.e., a film with all its photographic frames unexposed, or is "unfinished film," i.e., a film that had previously been taken out with some of its frames exposed, or that it is "finished film," i.e., a film with all its photographic frames exposed. The film state of use detection circuit 3, detects whether the film in the cartridge that is loaded in the cartridge chamber is a new film or an unfinished film. Note that a cartridge that contains a finished film, is mechanically prevented from being loaded in the cartridge chamber by a mechanism (not shown).

A film state of use setting circuit 4 drives an actuator 4a when the film cartridge is taken out of the cartridge chamber to indicate the film state of use, i.e., that the film is the new film, is the unfinished film, or is the finished film, on a mechanical indicator for the film cartridge.

Note that the state of use may be magnetically or optically recorded on the cartridge, or it may be magnetically recorded on the leader portion of the film.

A switch 5 is the main switch for setting the camera in the operating state, while a switch 6 is turned ON when the lid (not shown) of the cartridge chamber is opened. A recording circuit 7 magnetically records various types of information in the magnetic recording area of the film by driving a magnetic head 7a. A reproducing circuit 8 reproduces the various information magnetically recorded on the film by driving the magnetic head 7a. A driver 9 winds back the film by driving a wind-back motor 9a, while it also winds up the film by driving a windup motor 9b. A microcomputer 10, based upon a perforation detection signal from the perforation detection circuit 1, performs magnetic recording and reproduction through the recording circuit 7 and the reproducing circuit 8 and it also performs film feed through the driver 9.

Figure 2:
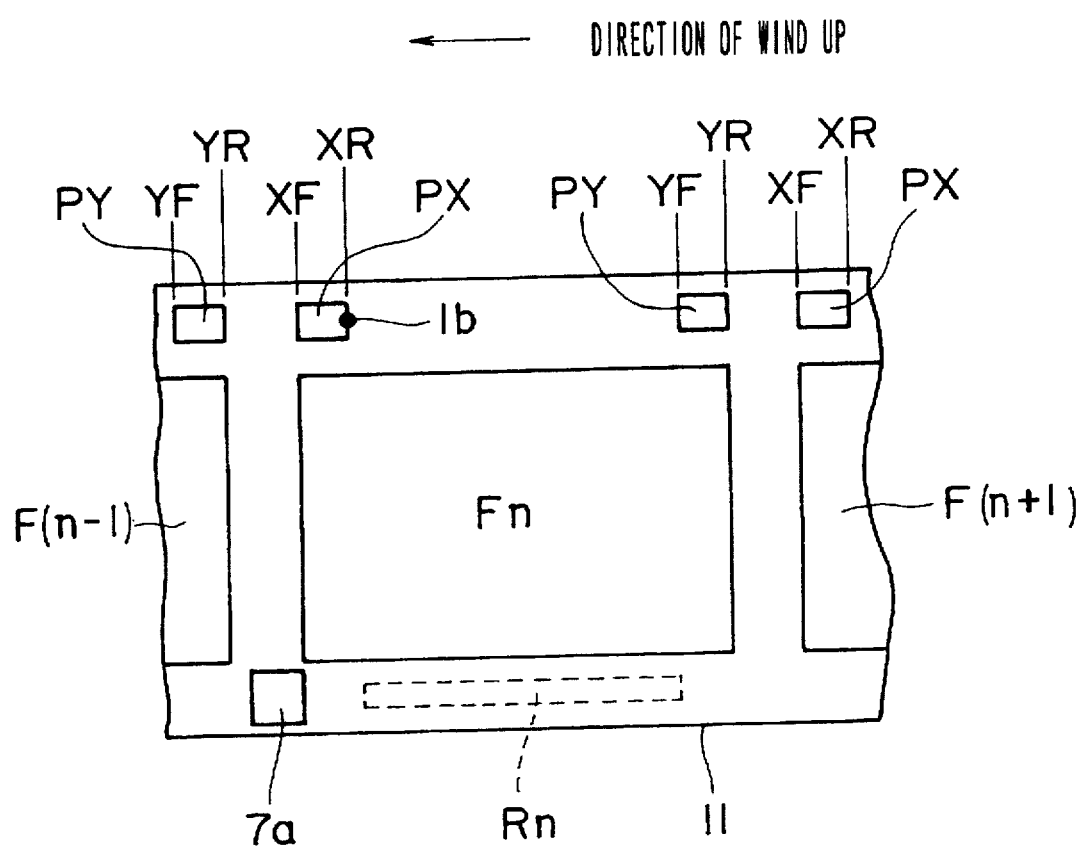
FIG. 2 shows the positional relationships among the photo interrupter and the magnetic head of the camera and the film used in the camera.

FIG. 2 shows the film used in this embodiment and, more specifically, it shows a state in which a given photographic frame Fn (n=1, 2,) is set at the photographing position, i.e., at the position that faces opposite the aperture. Note that the camera used in this embodiment is a so-called normal wind up type camera, which performs photographing while winding up the film one photographic frame at a time and is provided with a take-up spool on the left side and the cartridge chamber on the right side in the figure. This means that the wind up direction runs to the left, in the figure, with the wind back direction running to the right. The leader portion of the film is on the left side in the figure.

Each photographic frame of the film 11 is provided with two perforations in the upper area in the figure and, in the following explanation, the perforation that is located toward the leader portion (to the left) of a given photographic frame Fn is referred to as PX and the perforation on the opposite side is referred to as PY. In addition, the leading edge of the perforation PX in the direction in which the film is wound up is referred to as XF and the trailing edge is referred to as XR, while the leading edge of the perforation PY in the direction in which the film is wound up is referred to as YF and the trailing edge is referred to as YR. In the lower portion of the film 11 in the figure, a magnetic recording medium is applied and a magnetic recording area Rn (n=1, 2,) is assigned for each photographic frame Fn. Reference number 1b indicates the detection position of the photo interrupter 1a and reference number 7a indicates a magnetic head.

Figure 3A:
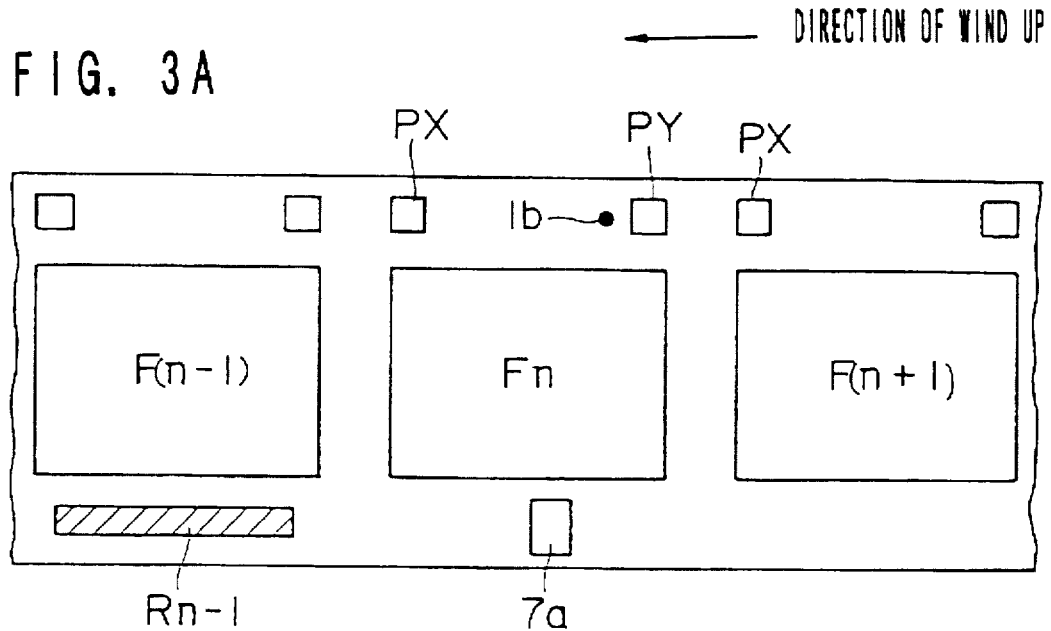
FIGS. 3A and 3B illustrate a first method for setting an unexposed frame of the unfinished film.
Figure 3B:
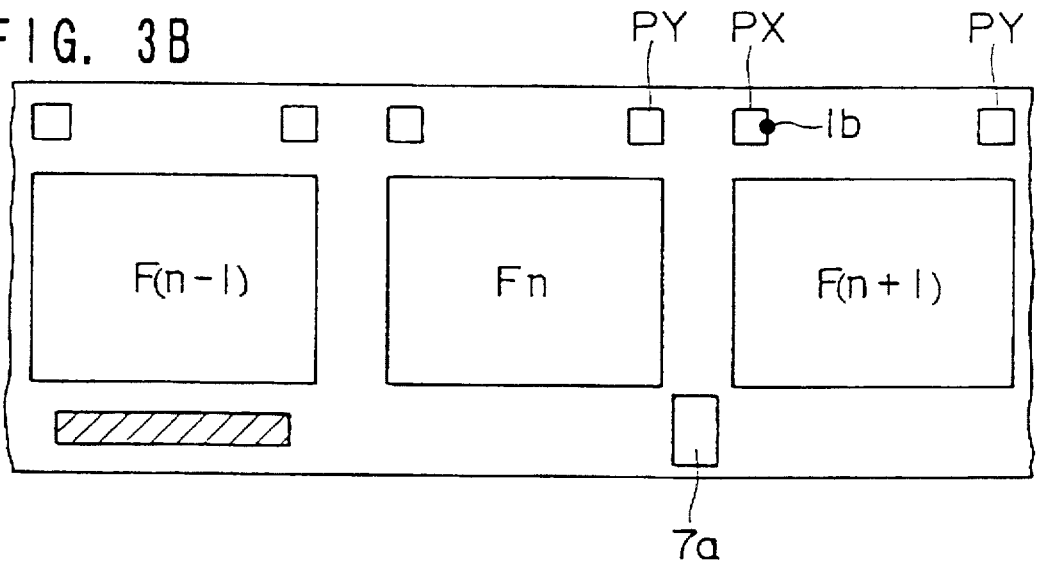

FIGS. 3A and 3B illustrate a first method for setting an unexposed photographic frame of the unfinished film at the photographing position. It is assumed that in FIGS. 3A and 3B, exposure has been completed for the photographic frames F1–F(n−1), with the photographic frame Fn and the subsequent frames remaining unexposed.

When the unfinished film is reloaded in the cartridge chamber, the reproducing circuit 8 sequentially reproduces the information recorded in the magnetic recording area of each photographic frame as the film is being wound up and, based upon the results of this reproduction, each frame is determined to be either exposed or unexposed. It is decided that a given frame has been exposed if photographic information with specific contents is reproduced and if, in contrast, photographic information with the specific contents is not reproduced, the frame is determined to be unexposed. Thus, since photographic information is reproduced from the individual magnetic recording areas assigned for photographic frames up to the photographic frame F(n−1), they are determined to be exposed, but photographic information is not reproduced from the magnetic recording area Rn of the photographic frame Fn and, therefore, the photographic frame Fn is determined to be unexposed. As shown in FIG. 3A, the decision as to whether or not the photographic frame Fn is exposed can be made when information reproduction has been performed up to the midway point of the magnetic recording area Rn of the photographic frame Fn. The film continues to be wound up even after the photographic frame Fn is determined to be unexposed, and when the leading edge YF of the perforation PY of the photographic frame Fn reaches the detection position 1b of the photo interrupter 1a, the film feed speed is reduced. Then, as shown in FIG. 3B, when the trailing edge XR of the perforation PX of the next photographic frame F(n+1) reaches the detection position 1b of the photo interrupter 1a, the film wind up stops. In this case, the photographic frame Fn will be skipped and photographing will resume with the photographic frame F(n+1).

Figure 4A:
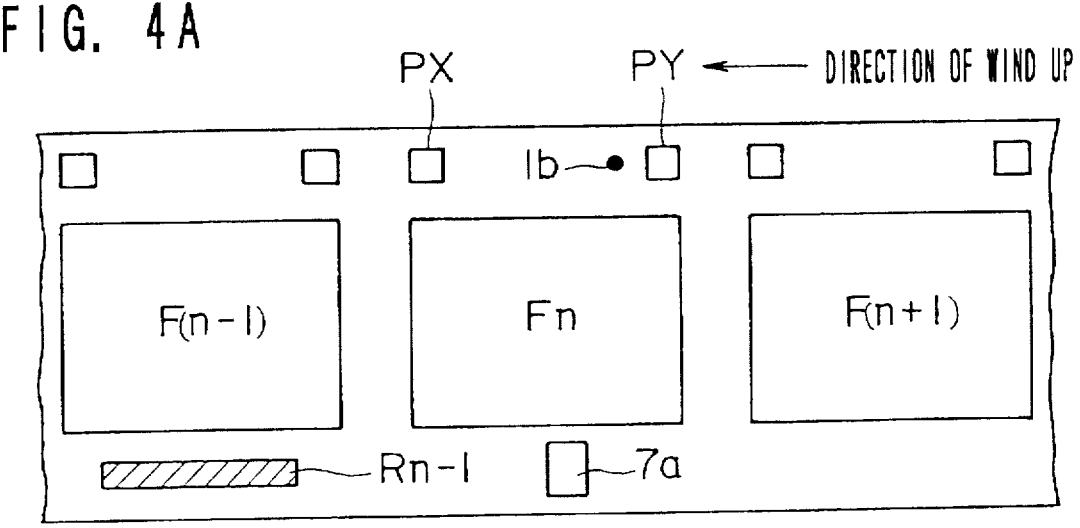
FIGS. 4A–4C illustrate a second method for setting an unexposed frame of the unfinished film.
Figure 4B:
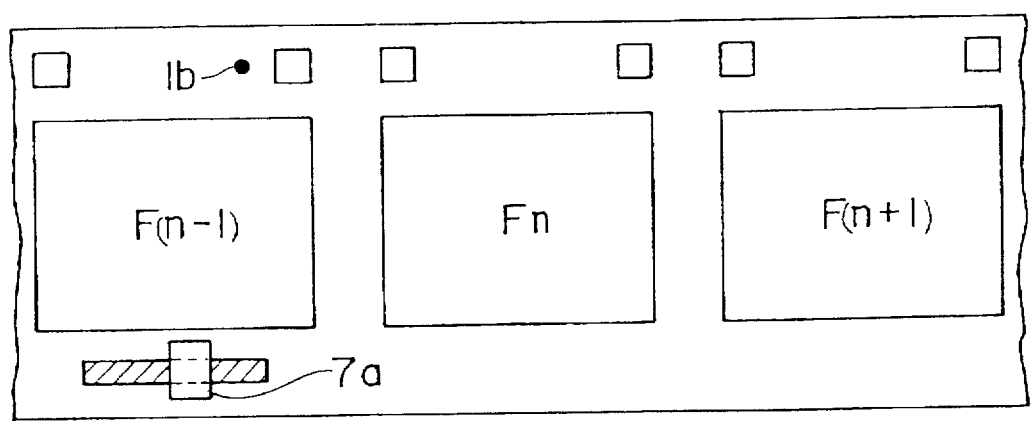
Figure 4C:
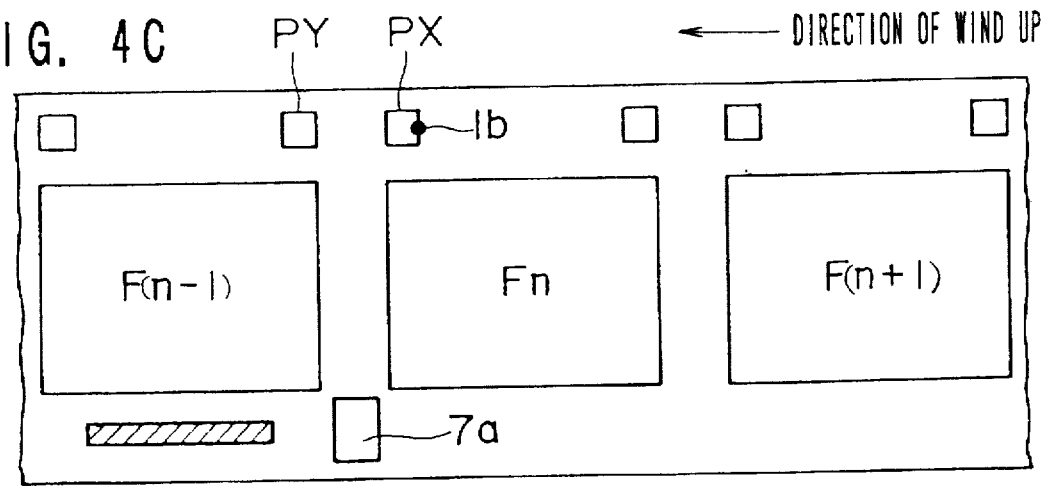
Figure 5:
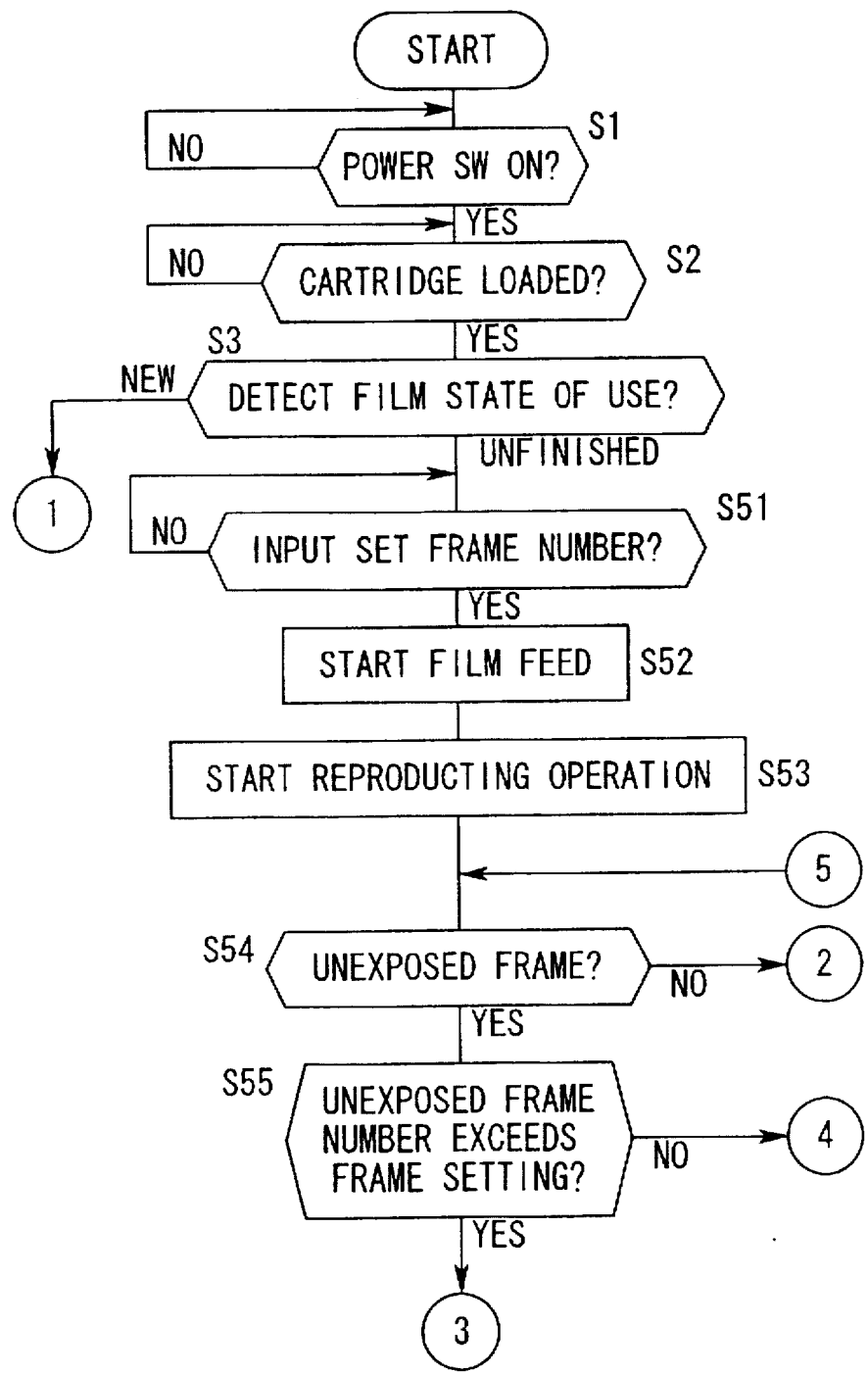
FIGS. 5–9, 10A and 10B are a flow chart showing the control program of the microcomputer.

FIGS. 4A–4C illustrate a second method for setting an unexposed photographic frame of the unfinished film at the photographing position. In this case, too, it is assumed that exposure has been completed for the photographic frames F1–F(n−1) with the photographic frame Fn and subsequent frames remaining unexposed.

When the unfinished film is reloaded, the reproducing circuit 8 sequentially reproduces the information recorded in the magnetic recording area of each photographic frame as the film is being wound up in the same manner as that described above and, based upon the results of this reproduction, each frame is determined to be either exposed or unexposed. Thus, since photographic information is reproduced from the individual magnetic recording areas for photographic frames up to the photographic frame F(n−1), they are determined to be exposed, but photographic information is not reproduced from the magnetic recording area Rn of the photographic frame Fn and, therefore, the photographic frame Fn is determined to be unexposed. As shown in FIG. 4A, the photographic frame Fn can be determined to be unexposed when information reproduction has been performed up to the midway point of the magnetic recording area Rn of the photographic frame Fn. When the photographic frame Fn is determined to be unexposed, film wind up is immediately stopped and, as shown in FIG. 4B, the film is wound back by one frame or more. Then, the film is fed in the direction of wind up again. When the leading edge YF of the perforation PY of the photographic frame F(n−1) reaches the detection position 1b of the photo interrupter 1a, the film feed speed is reduced. Then, as shown in FIG. 4C, when the trailing edge XR of the perforation PX of the photographic frame Fn reaches the detection position 1b of the photo interrupter 1a, film wind up stops. In this case, photographing will resume with the photographic frame Fn.

With either the first or the second method described above, since the an unexposed frame of the unfinished film is set at the photographing position while the film is being fed in the direction of wind up, which is the same as the direction of film feed after a normal exposure, the space between the exposed frame and F(n−1) the frame Fn or F(n+1) to be exposed is not reduced, thereby ensuring that the exposure areas of the two photographic frames do not overlap. With the first method, since one unexposed frame is skipped to start exposure with the next unexposed frame, one frame will be wasted. However, after the unfinished film is reloaded, a photographing-ready state is achieved promptly and photographing can be performed without missing a good photo opportunity. In contrast, with the second method, since the film is first wound back once an unexposed film is detected, and then the film is wound up to set that unexposed frame at the photographing position, photographing will be delayed by the length of time required for winding back the film but no frame will be wasted.

FIGS. 5–9 are flow charts of the control program executed by the microcomputer 10 in order to achieve the functions described above.

In step S1, the operation remains in standby until the camera is powered up through the operation of the main switch 5 and, at power up, the operation proceeds to step S2. In step S2, the operation waits for the film cartridge to be loaded in the cartridge chamber and also for the switch 6 to detect that the lid of the cartridge chamber has been closed, before proceeding to step S3. In step S3, the state of use of the loaded film is detected by the film state of use detection circuit 3. If the film is new one, the operation proceeds to step S11 while, if the film is unfinished one, the operation proceeds to step S51, shown in FIG. 8.

In step S11, the film is drawn out from the cartridge containing the new film via the driver 9 and it is taken up on a take-up spool (not shown). In step S12, the first photographic frame F1 is set at the photographing position and in step S13, the first photographic frame F1 is exposed through a regular photographing operation. In step S14, a decision is made as to whether or not a wind back button (not shown) has been operated and if the decision is affirmative, the operation proceeds to step S15. In step S15, the wind-back motor 9a is driven via the driver 9 to start winding back the film. When the wind back is completed, the motor 9a is stopped via the driver 9 in step S16. Note that whether or not wind up has been completed may be detected, for instance, based upon the results of perforation detection performed by the perforation detection circuit 1. In step S17, the actuator 4a is driven by the film state of use setting circuit 4 to set the mechanical indicator for the film to "unfinished."

If, on the other hand, the wind back operation by the wind back button has not been performed, the operation proceeds from step S14 to step S18, in which a decision is made as to whether or not exposure has been completed for the last photographic frame. If the exposure for the last photographic frame has been completed, i.e., if exposure of all the photographic frames has been completed, the operation proceeds to step S19. If not, the operation returns to step S13. In step S19, film wind back is started via the driver 9 and when the wind back is completed, the motor 9a is stopped by the driver 9 in step S20. In step S21, via the film state of use setting circuit 4, the indicator mechanism for the film is set to "finished."

If the loaded film is unfinished, the operation proceeds from step S3 to step S51, in which the operation waits for the photographic frame number setting circuit 2 to set the frame number and when the photographic frame number is set, the operation proceeds to step S52. The frame number thus set is used to decide whether the first method or the second method mentioned earlier is to be selected and its details are to be explained later. In step S52, the film is drawn out from the cartridge via the driver 9 and it is then wound up on the take-up spool (not shown). In step S53, the information reproducing operation to reproduce information from the magnetic recording areas of the film starts via the reproducing circuit 8. In step S54, a decision is made as to whether or not a given frame has been exposed based upon the results of information reproduction and if it has been exposed, the operation proceeds to step S56.

In step S56, a decision is made as to whether or not the photographic frame Fn is the last photographic frame and if it is, the operation proceeds to step S57. If it is not the last photographic frame, the operation returns to step S54. In step S57, since no unexposed frame has been detected, even though the loaded film has been determined to be unfinished, an error indication is made on an indicator (not shown). In step S58, film wind up is stopped via the driver 9 and in step S59, film wind back is started. When the wind back is completed, the motor 9a is stopped in step S60. In step S61, via the film state of use setting circuit 4, the mechanical indicator for the film is set to "finished."

If, on the other hand, an unexposed frame is detected in step S54, the operation proceeds to step S55, in which a decision is made as to whether or not the number of the unexposed frame is equal to or exceeds the frame number set by the photographic frame number setting circuit 2. If the frame number of the unexposed frame is equal to or exceeds the number setting, the operation proceeds to step S101, in which the unexposed frame is set at the photographing position through the first method described above. If the frame number of the unexposed frame is smaller than the frame number setting, the operation proceeds to step S201, in which the unexposed frame is set at the photographing position through the second method described above.

First, the first method, which corresponds to steps S101 to S110 is explained. Note that it is assumed that the photographic frame Fn and all subsequent frames of the unfinished film have not been exposed.

In step S101, based upon the output from the perforation detection circuit 1, a decision is made as to whether or not the leading edge YF of the perforation PY of the unexposed frame Fn has reached the detection position 1b of the photo interrupter 1a. If an affirmative decision is made in step S101, the operation proceeds to step S102, in which the film wind up speed is reduced by performing duty drive for the motor 9b via the driver 9. In step S103, through the perforation detection circuit 1, a decision is made as to whether or not the trailing edge XR of the perforation PX of the following unexposed frame F(n+1) has reached the detection position 1b of the photo interrupter 1a. If an affirmative decision is made in step S103, the operation proceeds to step S104, in which the film wind up is stopped via the driver 9.

A normal photographing operation is performed in step S105. Then in step S106, a decision is made as to whether or not the wind back operation by the wind back button has been performed. If the wind back operation has been performed, the operation proceeds to step S108. If the wind back operation has not been performed, the operation proceeds to step S107. In step S107, a decision is made as to whether or not photographing of the last photographic frame has been completed. If a negative decision is made, the operation returns to step S5. If an affirmative decision is made, the operation proceeds to step S108. In step S108, film wind back starts and when the wind back is completed, the motor 9a is stopped in step S109.

In step S110, via the film state of use setting circuit 4, the mechanical indicator for the film is set to "finished." If photographing is carried on in the first method for the unfinished film, an unexposed frame will be left between exposed frames. If this unfinished film is taken out again unfinished, and then photographing is continued in the first method, there is a likelihood that the unexposed frame between exposed frames being skipped and photographing starting with the next frame (exposed frame). In that case, the frame will be double exposed. In order to prevent such double exposures, in this embodiment, "finished" is set when unfinished film that has been reloaded is taken out unfinished again.

Next, the second method, which corresponds to steps S201–S211 is explained. Note that it is assumed that the photographic frame Fn and all subsequent frames of the unfinished film have not been exposed.

In step S201, film wind up is stopped and then in step S202, wind back is started. In step S203, a decision is made as to whether or not the trailing edge XR of the perforation PX of the photographic frame Fn has reached the detection position 1b of the photo interrupter 1a, and if an affirmative decision is made, the timer is reset and started in step S204.

In step S205, the operation waits for the time T to elapse, that is required for winding back the film by one frame after the timer starts and then the operation proceeds to step S206, to stop wind back of the film.

In step S207, wind up of film is started again and in step 208, a decision is made as to whether or not the leading edge YF of the perforation PY of the photographic frame F(n−1) has reached the detection position 1b of the photo interrupter 1a. If an affirmative decision is made in step S208, the operation proceeds to step S209, in which the film feed speed is reduced by performing duty drive for the windup motor 9b. In step S210, a decision is made as to whether or not the trailing edge XR of the perforation PX of the photographic frame Fn has reached the detection position 1b of the photo interrupter 1a. If an affirmative decision is made, film wind up is stopped in step S211. Then the operation proceeds to step S13 to perform the processing described earlier.

Figure 6:
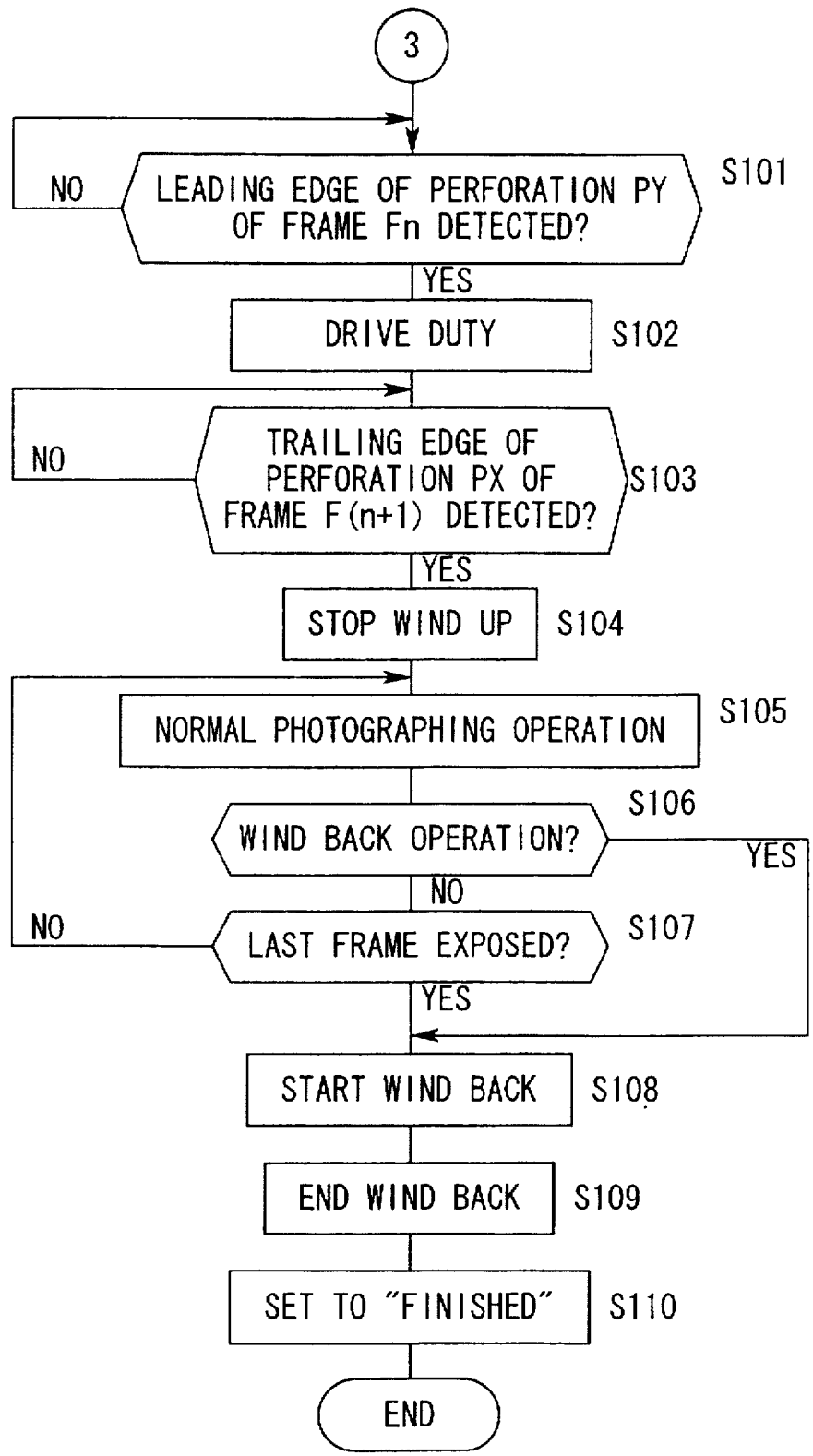
Figure 7:
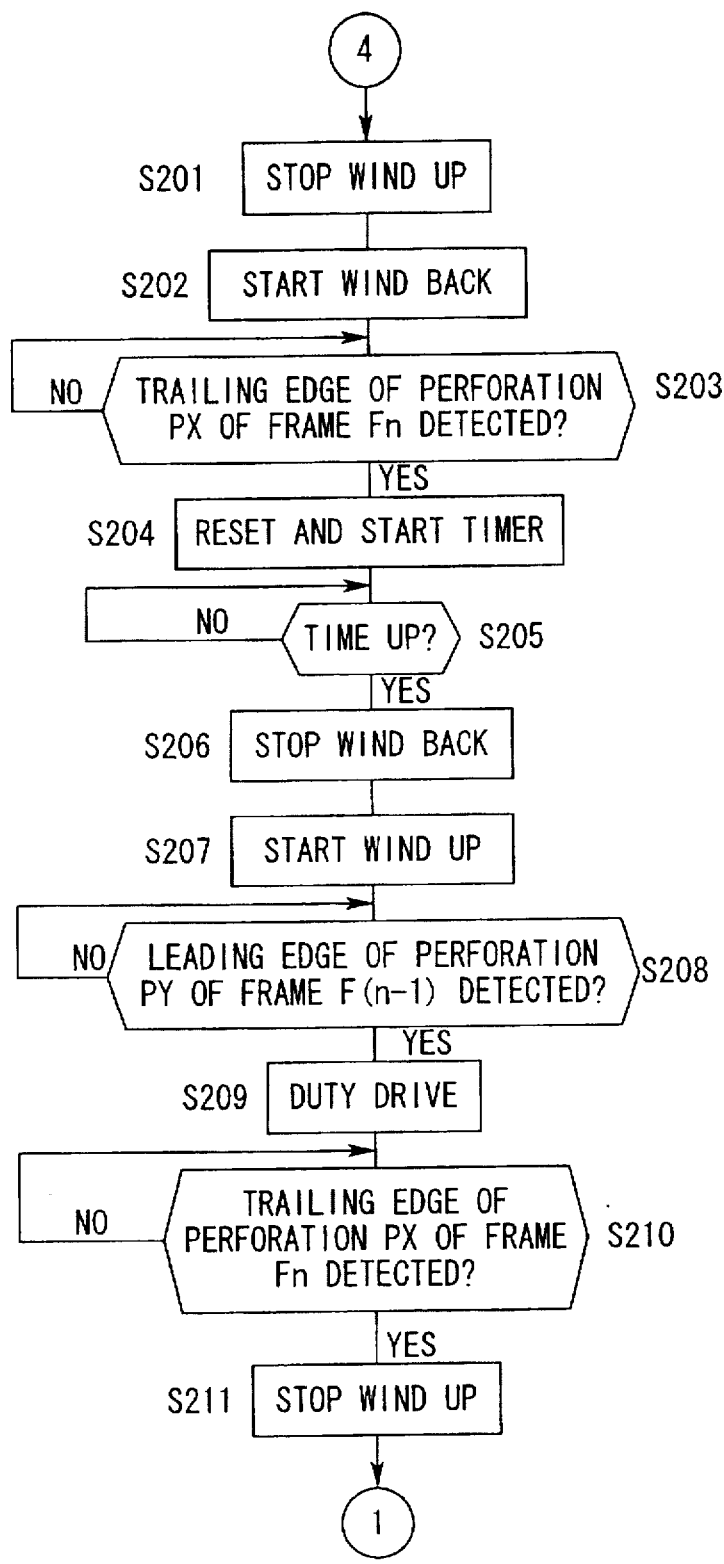
Figure 8:
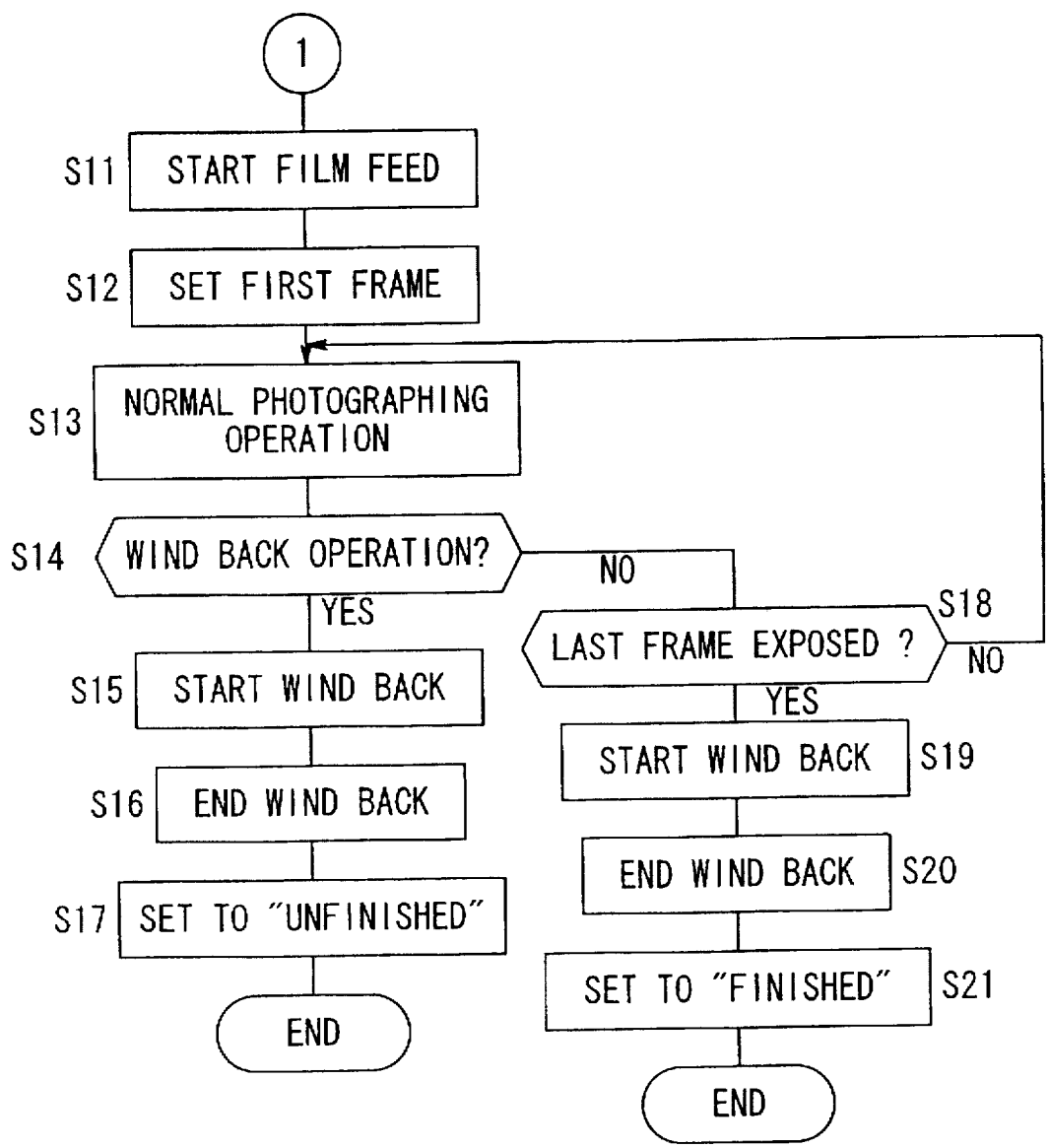
Figure 9:
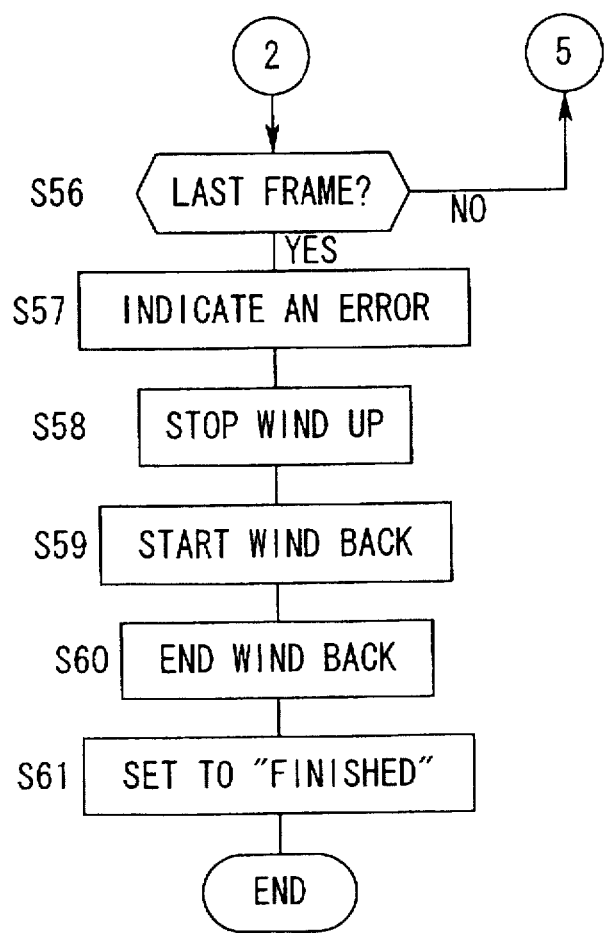
Figure 10A:
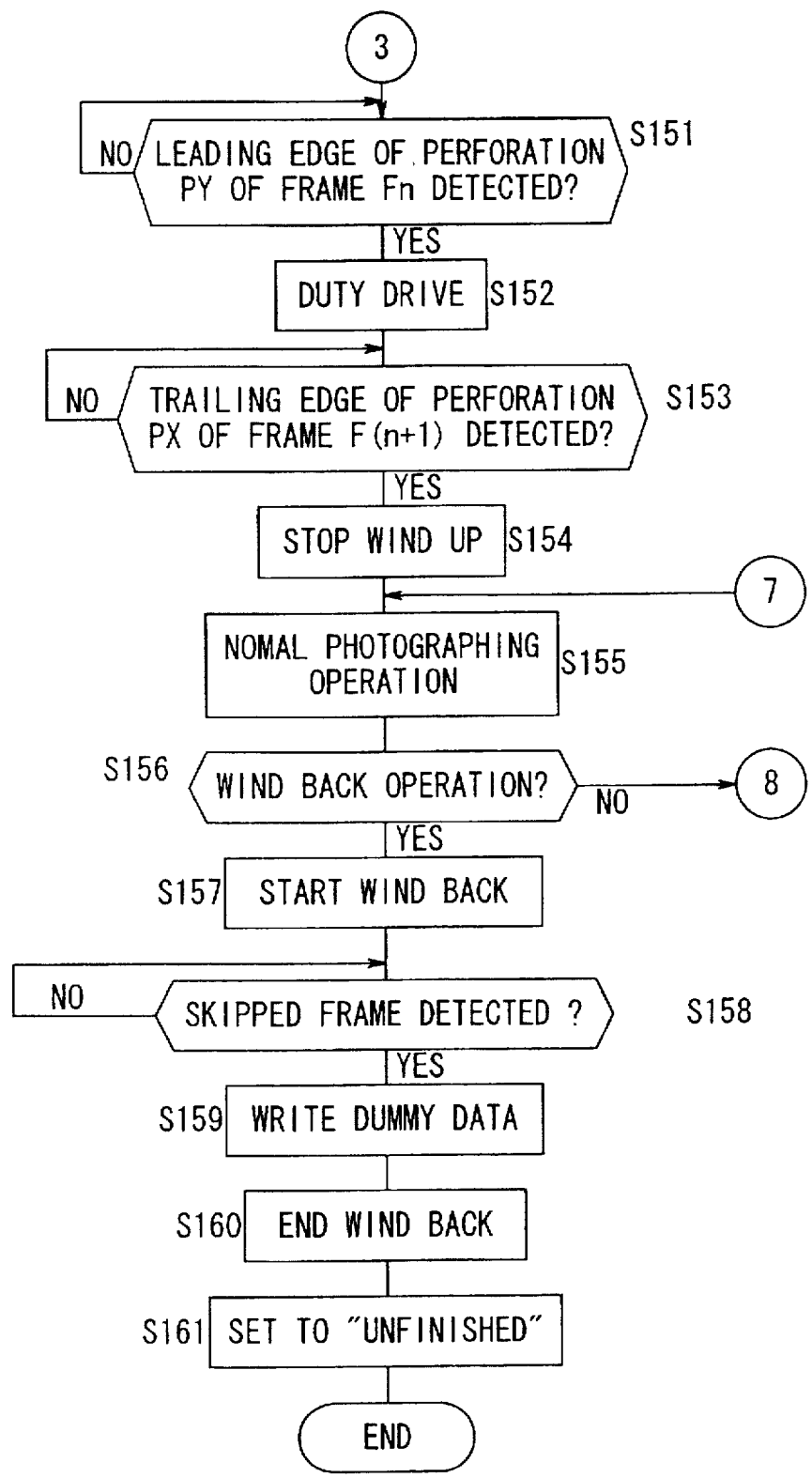
Figure 10B:
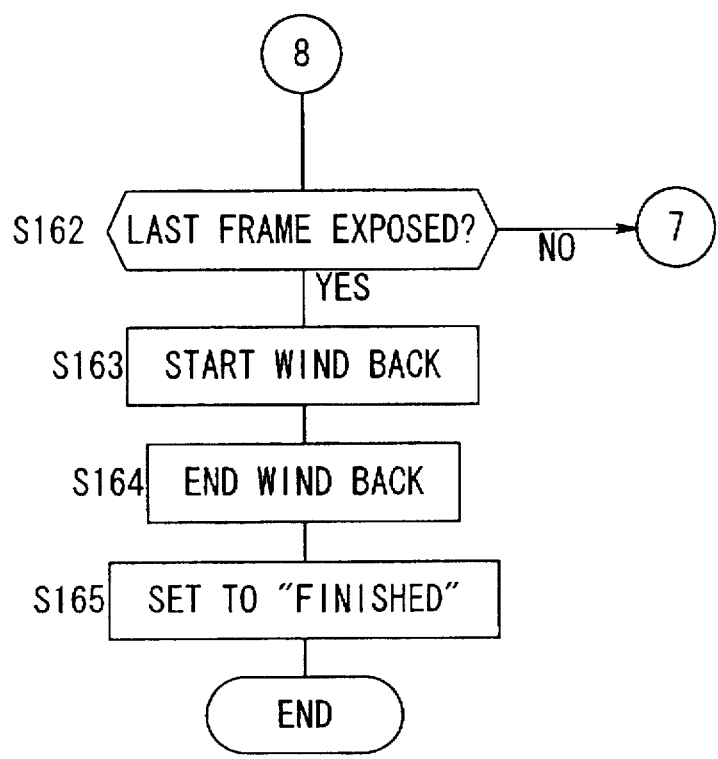

FIGS. 10A and 10B are a flow chart showing another embodiment of the first method and they correspond to FIG. 6.

In step 151, a decision is made as to whether or not the leading edge YF of the perforation PY of the photographic frame Fn has reached the detection position 1b of the photo interrupter 1a. If an affirmative decision is made, the operation proceeds to step S152, in which the film feed speed is reduced by performing duty drive of the wind-back motor 9a. In step S153, a decision is made as to whether or not the trailing edge XR of the perforation PX of the photographic frame F(n+1) has reached the detection position 1b of the photo interrupter 1a. If an affirmative decision is made, film wind up is stopped in step S154. With this, the unexposed frame F(n+1) is set at the photographing position.

In step S155, exposure is performed and then in step S156, a decision is made as to whether or not the wind back operation has been performed through the wind back button. If the wind back operation has been performed, the operation proceeds to step S157, to start winding back the film. In step S158, the photographic frame for which exposure has not been performed and which, therefore, has been skipped when performing the first method, is detected. This frame may be detected, for instance, by storing its frame number in memory in the microcomputer 10 when setting the unexposed frame at the photographing position in the first method and then by using the frame number of the skipped frame and the film feed quantity based upon the results of perforation detection when the film is being wound back.

In step S159, dummy data for causing the skipped frame to be recognized as an exposed frame are recorded in the magnetic recording area of the skipped frame by the recording circuit 7. When the wind back is completed, the wind-back motor 9a is stopped in step S160 and in step S161, via the film state of use setting circuit 4, the mechanical indicator for the film cartridge is set to "unfinished." Since dummy data have been recorded for the skipped frame, in this case, no double exposure, such as described earlier, will occur when photographing even if the unfinished film is taken out again and then reloaded.

If, in contrast, no wind back operation has been performed in step S156, a decision is made in step S162 as to whether or not photographing of the last photographic frame has been completed. If a negative decision is made, the operation returns to step S155 and if an affirmative decision is made, the operation proceeds to step S163. In step S163, film wind back starts and when the wind back is completed, the wind-back motor 9a is stopped in step S164. In step S165, the mechanical indicator for the film cartridge is set to "finished," via the film state of use setting circuit 4.

While the embodiment above has been explained for a so-called normal wind up type camera, which winds up the film into the camera one frame at a time for each exposure, the present invention may be applied to the so-called prewind type camera, in which the film is entirely wound up prior to photographing and then wound back into the cartridge one frame at a time for each exposure. In the latter case, the detection position of the photo interrupter and the installation position of the magnetic head must be changed to positions that are appropriate for the prewind method and also, part of the control program shown in FIGS. 5–10A and 10B must be changed to suit the prewind method.

—Second Embodiment—

The second embodiment according to the present invention is explained in reference to FIGS. 11–21.

Figure 11:
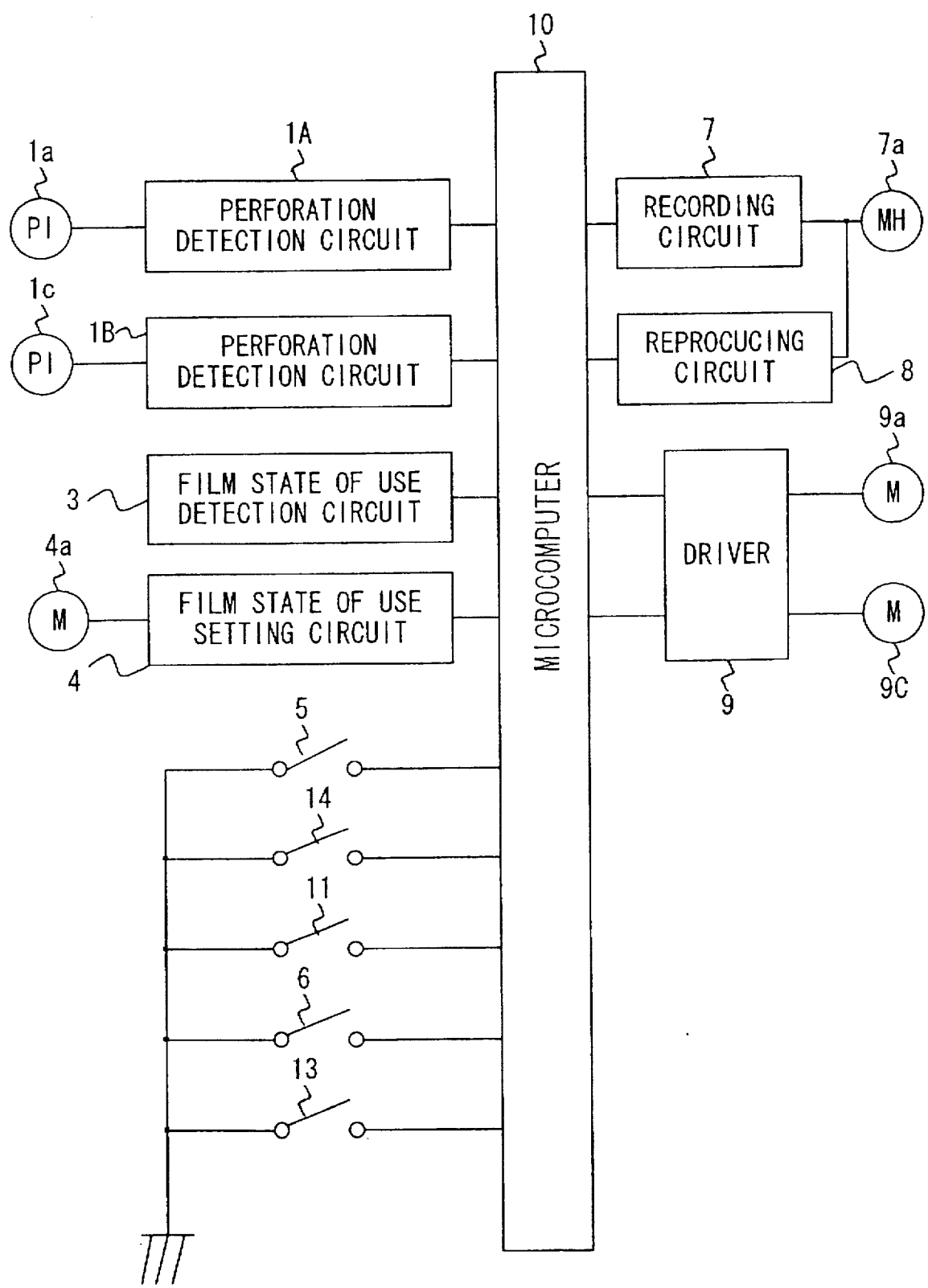
FIG. 11 is a block diagram showing the structure of the control system of the camera in a second embodiment according to the present invention.

FIG. 11 is a block diagram of the control system of the camera wherein components identical to those in FIG. 1 are assigned the same reference numbers.

A perforation detection circuit 1B, which is separate from the perforation detection circuit 1A, detects perforations in the film with a photo interrupter 1c. Based upon the results of the detection performed by the perforation detection circuit 1B, the magnetic recording end timing for each photographic frame and the film feed stop timing are determined.

A switch 14 is a release switch that is turned ON when a release operation is performed with a release button (not shown). A switch 11 is turned OFF when a cartridge is loaded in the cartridge chamber (not shown) and a switch 13 is a wind-back switch that is turned ON when a film wind-back button is operated.

Figure 12:
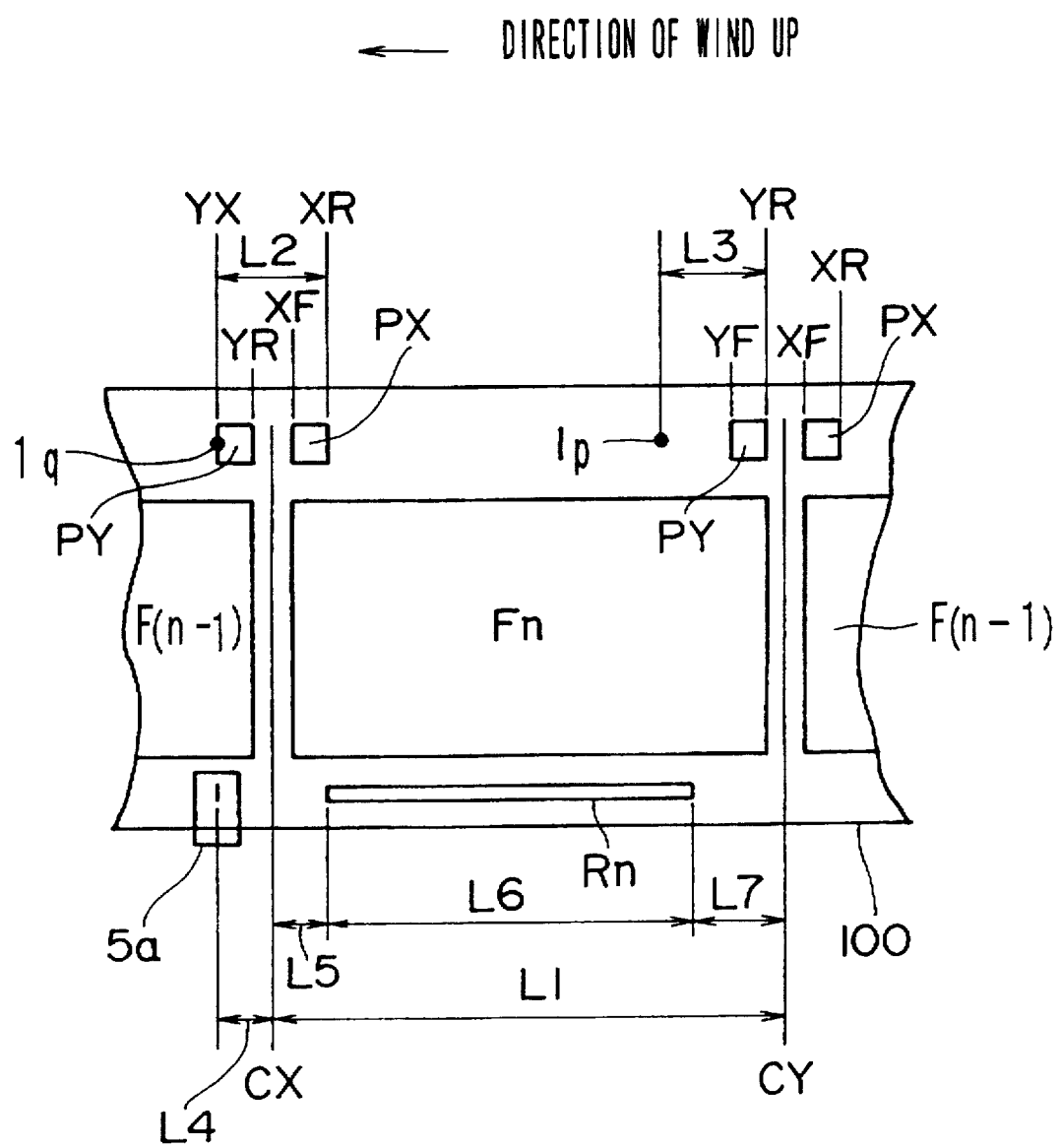
FIG. 12 shows the positional relationships among the photo interrupter and the magnetic head of the camera and the film.

FIG. 12 shows the positional relationships that the photo interrupters 1a, 1c and the magnetic head 7a have relative to the film in a state in which a given photographic frame Fn is set at the photographing position. Note that the camera used in this embodiment is a so-called normal wind up type camera, which performs photographing by winding up film one photographic frame at a time and is provided with a take-up spool (not shown) on the left side and the cartridge chamber on the right side in the figure. This means that the wind up direction runs to the left in the figure, with the wind back direction running to the right. The leader portion of the film is on the left side in the figure.

Each photographic frame of the film 100 is provided with two perforations on one side and, in the following explanation, the perforation that is located toward the leader portion (to the left in the figure) of a given photographic frame Fn (n =1, 2, . . . ) is referred to as PX and the perforation toward the trailing edge side is referred to as PY. On the other side of the film 100 in the figure, a magnetic recording medium is applied and a magnetic recording area Rn (n=1, 2, . . . ) is assigned for each photographic frame Fn. Reference number 1p indicates the detection position of the photo interrupter 1a provided toward the take-up spool side. Reference number 1q indicates the detection position of the photo interrupter 1c provided toward the cartridge chamber, and a magnetic head 5a is provided at the position indicated in the figure toward the take-up spool.

CX and CY indicate borders between adjacent frames and, in the following explanation, the border toward the leader portion of each photographic frame Fn is referred to as CX, while the border on the other side is referred to as CY. In addition, the leading edge of the perforation PX of a given photographic frame Fn in the direction of film wind up is referred to as XF and the trailing edge is referred to as XR, while the leading edge of the perforation PY in the direction of film wind up is referred to as YF and the trailing edge is referred to as YR. The space between the border CX and the border CY, i.e., the distance between frames, is referred to as L1. The distance between the leading edge YF of the perforation PY of the photographic frame F(n−1) and the trailing edge XR of the perforation PX of the photographic frame Fn is referred to as L2. In addition, the distance between the detection position 101 and the trailing edge YR of the perforation PY when the photographic frame Fn is in the photographing position is referred to as L3, while the distance between the recording center of the magnetic head 103 and the border CX is referred to as L4. The magnetic recording area Rn of each photographic frame Fn is an area of length L6, whose front end is at a position that is away from the border CX by the distance L5 and the distance between its rear end and the border CY is referred to as L7.

The unexposed frame detection operation performed in this embodiment is explained in reference to FIGS. 13A–13D. It is assumed that the loaded film is unfinished film and that the photographic frames F1–F(n−1) have been exposed with the photographic frame Fn and all subsequent frames remaining unexposed.

(1) When the film cartridge is loaded in the cartridge chamber, a detection is made as to whether the film is an unfinished film or a new film. If the film is unfinished, it is wound up while reproducing the information recorded in the magnetic recording areas of the individual photographic frames. In the magnetic recording areas of exposed frames, various types of photographic information have been recorded during exposure, while in the magnetic recording areas of unexposed frames, no information is recorded. Since, in FIG. 13A, the frame F(n−1) has been exposed, its photographic information is reproduced and with this, the frame is determined to be exposed.

Figure 13A:
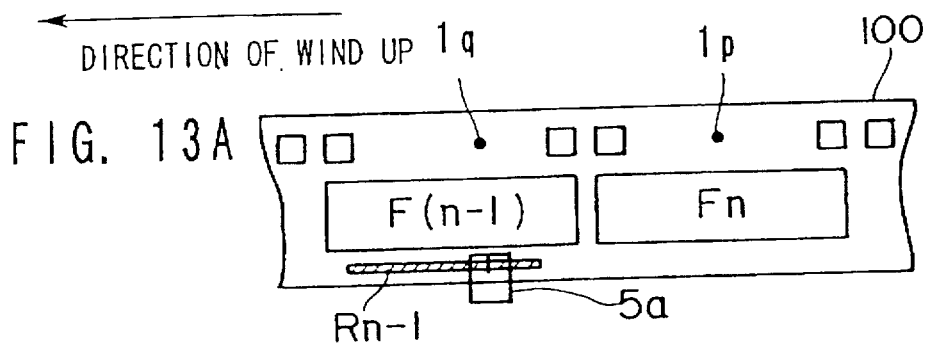
FIGS. 13A–13D illustrate an unexposed frame detection operation.
Figure 13B:
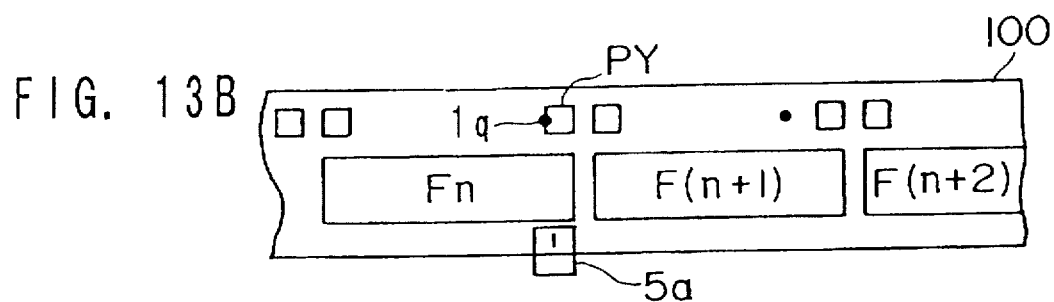

(2) While winding up the film further, reproduction of magnetic information recorded for the photographic frame Fn is performed. Since the photographic frame Fn has not been exposed, no photographic information is reproduced, and with this, the frame is determined to be unexposed. When the leading edge YF of the perforation PY of the photographic frame Fn reaches the detection position 1q of the photo interrupter 1c, as shown in FIG. 13B, film feed stops.

Figure 13C:
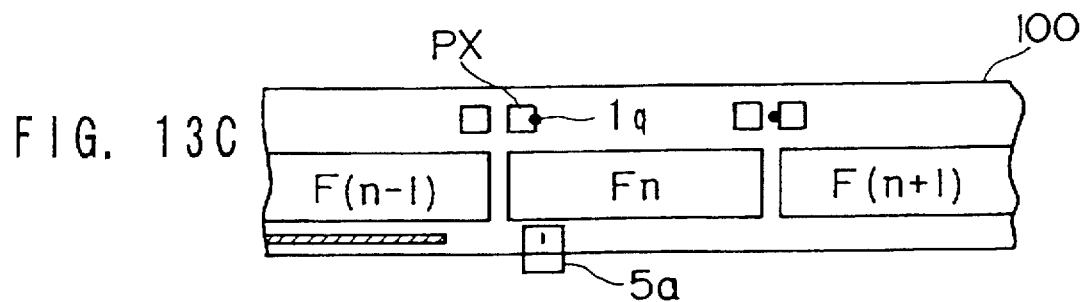

(3) Since, in this state, the photographic frame F(n+1) is set at the photographing position, the film starts to be wound back, in order to set the photographic frame (the first unexposed frame) Fn at the photographing position. When the trailing edge XR of the perforation PX of the photographic frame Fn reaches the detection position 1q of the photo interrupter 1c, as shown in FIG. 13C, duty drive of the film feed motor is started, to reduce the feed speed.

Figure 13D:
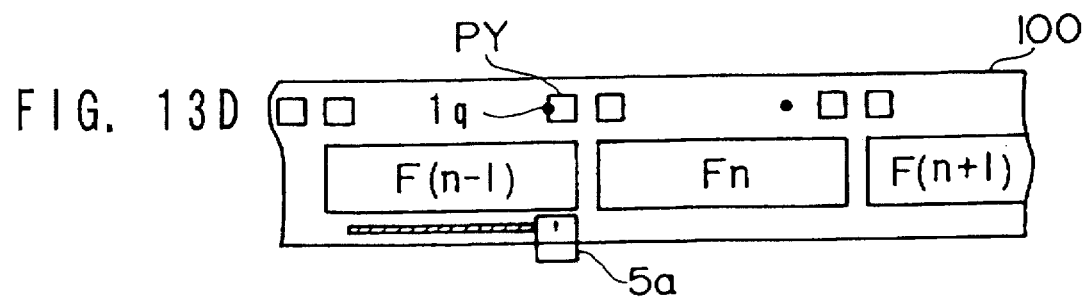

(4) When the leading edge YF of the perforation PY of the photographic frame F(n−1) reaches the detection position 1q of the photo interrupter 1c, as shown in FIG. 13D, film feed stops.

Through the procedure explained in (1)–(4) above, the first unexposed frame of an unfinished film can be set at the photographing position.

Next, the operation performed when recording information in the magnetic recording area of the photographic frame Fn is explained in reference to FIGS. 14A–14F.

Figure 14A:
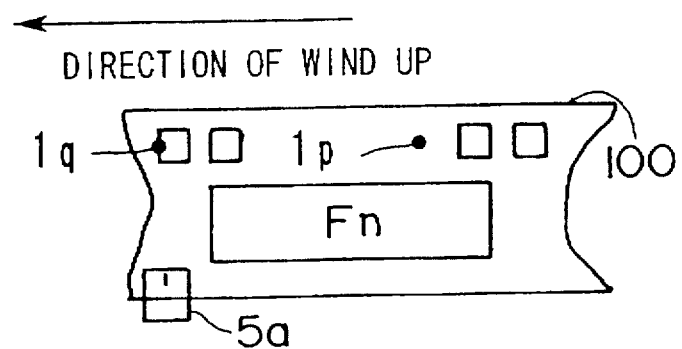
FIGS. 14A–14F illustrate a magnetic recording operation.

(1) FIG. 14A shows a state in which the photographic frame Fn is set at the photographing position. When exposure of the photographic frame Fn is completed in this state, film wind up starts.

Figure 14B:
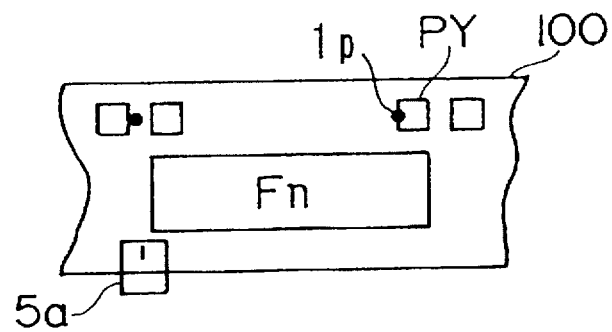
Figure 14C:
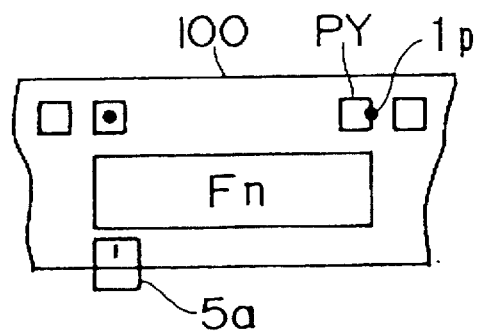

(2) The film feed time elapsing after the leading edge YF of the perforation PY of the photographic frame Fn reaches the detection position 1p of the photo interrupter 1a, as shown in FIG. 14B, until the trailing edge YR reaches the detection position 1p, as shown in FIG. 14C, is counted by a timer. Based upon the counted time and the distance from the leading edge YF of the perforation PY to the trailing edge YR, the film feed speed is calculated. In correspondence to the calculated film feed speed, a magnetic recording frequency that will achieve a specific magnetic recording density is calculated and magnetic recording is started by the magnetic head 7a, with a recording signal at the frequency thus calculated.

Figure 14D:
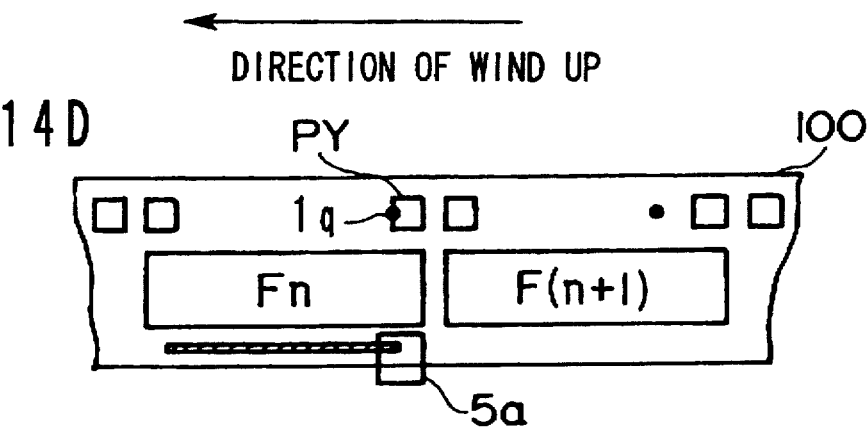

(3) When the leading edge YF of the perforation PY of the photographic frame Fn reaches the detection position 1q of the photo interrupter 1c, as shown in FIG. 14D, the magnetic recording ends.

Figure 14E:
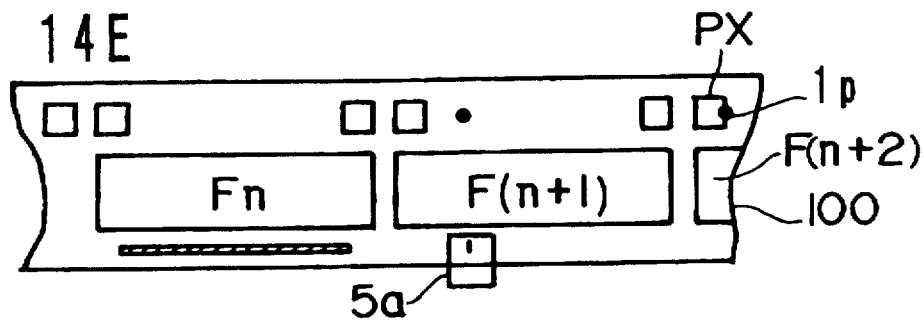

(4) The film is further wound up and when the trailing edge XR of the perforation PX of the photographic frame F(n+2) reaches the detection position 1p of the photo interrupter 1a, as shown in FIG. 14E, the film wind up stops and wind back starts.

Figure 14F:
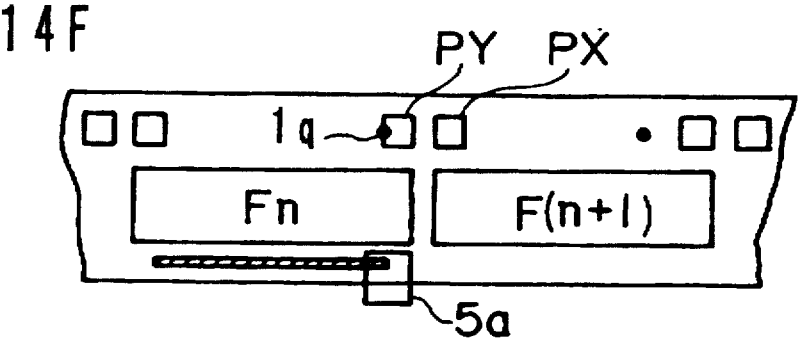

(5) After the wind back starts, when the trailing edge XR of the perforation PX of the photographic frame F(n+1) reaches the detection position 1q of the photo interrupter 1c, duty drive of the film feed motor is started, to reduce the feed speed. Then, when the leading edge YF of the perforation PY of the photographic frame Fn reaches the detection position 1q, as shown in FIG. 14F, the film feed stops. As a result, the photographic frame F(n+1) is set at the photographing position.

Now, the length L6 of the magnetic recording area Rn in the magnetic recording operation in this embodiment is examined.

The position of the film when the magnetic recording for the photographic frame Fn is completed is the position at which the leading edge YF of the perforation PY has reached the detection position 1q, as shown in FIG. 14D. This film position is approximately the same as that shown in FIG. 14F, i.e., the position when the next photographic frame F(n+1) is set at the photographing position. In other words, in this embodiment, magnetic recording can be performed during film feed after the photographic frame Fn is exposed until the next photographic frame F(n+1) is positioned at the photographing position. Consequently, the magnetic head 7a is positioned at the rear end of the magnetic recording area Rn when the photographic frame F(n+1) is at the photographing position. Note that, while the position of the magnetic recording area Rn relative to each photographic frame Fn can be arbitrarily determined by changing the position of the magnetic head 7a in the direction of film feed, the length L6 (FIG. 12) itself of the magnetic recording area Rn does not change.

The quantity of film fed after exposure of a given photographic frame Fn is completed until the next photographic frame F(n+1) is set at the photographing position (the quantity of film fed during the time elapsing from the state shown in FIG. 14A until the state shown in FIG. 14F) is equal to the photographic frame interval L1. In addition, the quantity of film fed after film feed starts until the beginning of magnetic recording (the quantity of film fed during the time elapsing from the state shown in FIG. 14A until the state shown in FIG. 14C—this period of time includes the film acceleration period) is L3. Furthermore, the speed reducing period of film feed is the period of time elapsing from the state shown in FIG. 14D until the state shown in FIG. 14E, and speed reduction of the film feed does not take place until the state shown in FIG. 14D is achieved. As a result, the length L6 of the magnetic recording area Rn in this embodiment is equivalent to the difference obtained when the film feed quantity L3, during the film acceleration period, is subtracted from the photographic frame interval L1 and is, therefore, expressed:

$$L6=L1-L3$$

Next, the length L6 of the magnetic recording area Rn of each photographic frame that is achieved when the prior art method, shown in FIGS. 24A–24E, is employed for the film shown in FIG. 12, is examined.

Figure 24:
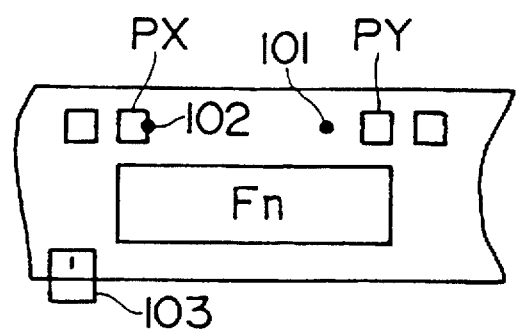
FIGS. 24A–24E illustrate a magnetic recording operation performed by a camera in the prior art.
Figure 24B:
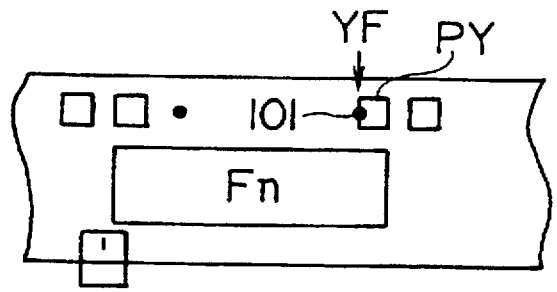
Figure 24C:
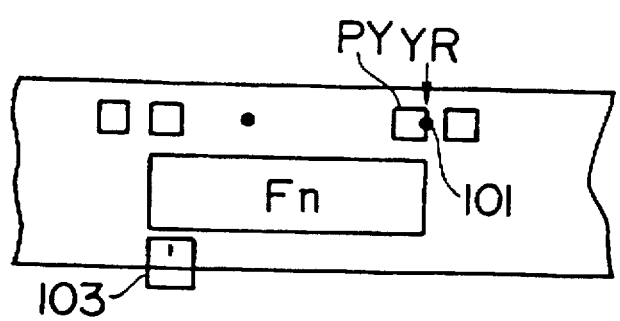
Figure 24D:
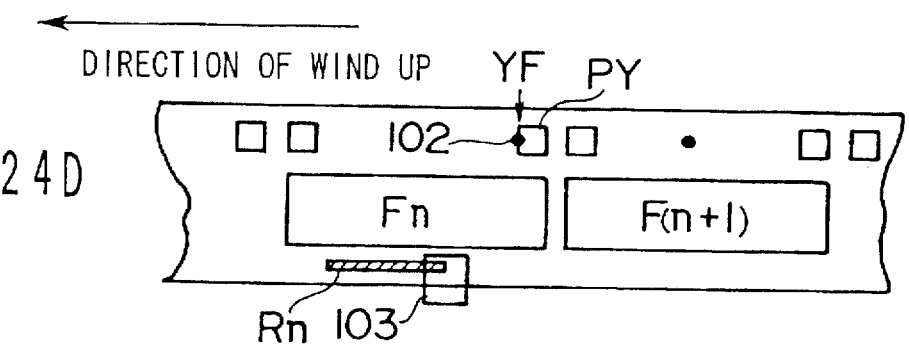
Figure 24E:
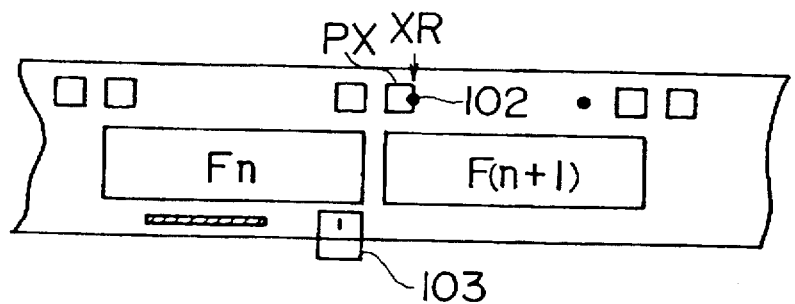

The quantity of film fed after exposure of a given photographic frame Fn is completed until the next photographic frame F(n+1) is set at the photographing position (the quantity of film fed during the time elapsing from the state shown in FIG. 24A until the state shown in FIG. 24E) is equal to the photographic frame interval L1. In addition, the quantity of film fed after film feed starts until the beginning of magnetic recording (the quantity of film fed during the time elapsing from the state shown in FIG. 24A until the state shown in FIG. 24C—this period of time includes the film acceleration period) is L3. Furthermore, the quantity of film fed after the end of magnetic recording until the next photographic frame F(n+1) is set at the photographing position (the quantity of film fed from the state shown in FIG. 24D until the state shown in FIG. 24E—this period of time includes the film deceleration period) is L2. Thus, the length L6 of the magnetic recording area Rn in the prior art, is equivalent to the result of subtracting the film feed quantity L3 during the acceleration period and the film feed quantity L2 during film deceleration from the photographic frame interval L1, and is, therefore, expressed:

$$L6=L1-L2-L3$$

As is obvious from the explanation above, the length (L1–L3) of the magnetic recording area in this embodiment is longer than the length (L1–L2–L3) of the magnetic recording area in a prior art apparatus, by the length L2. As a result, more information can be recorded.

Figure 15:
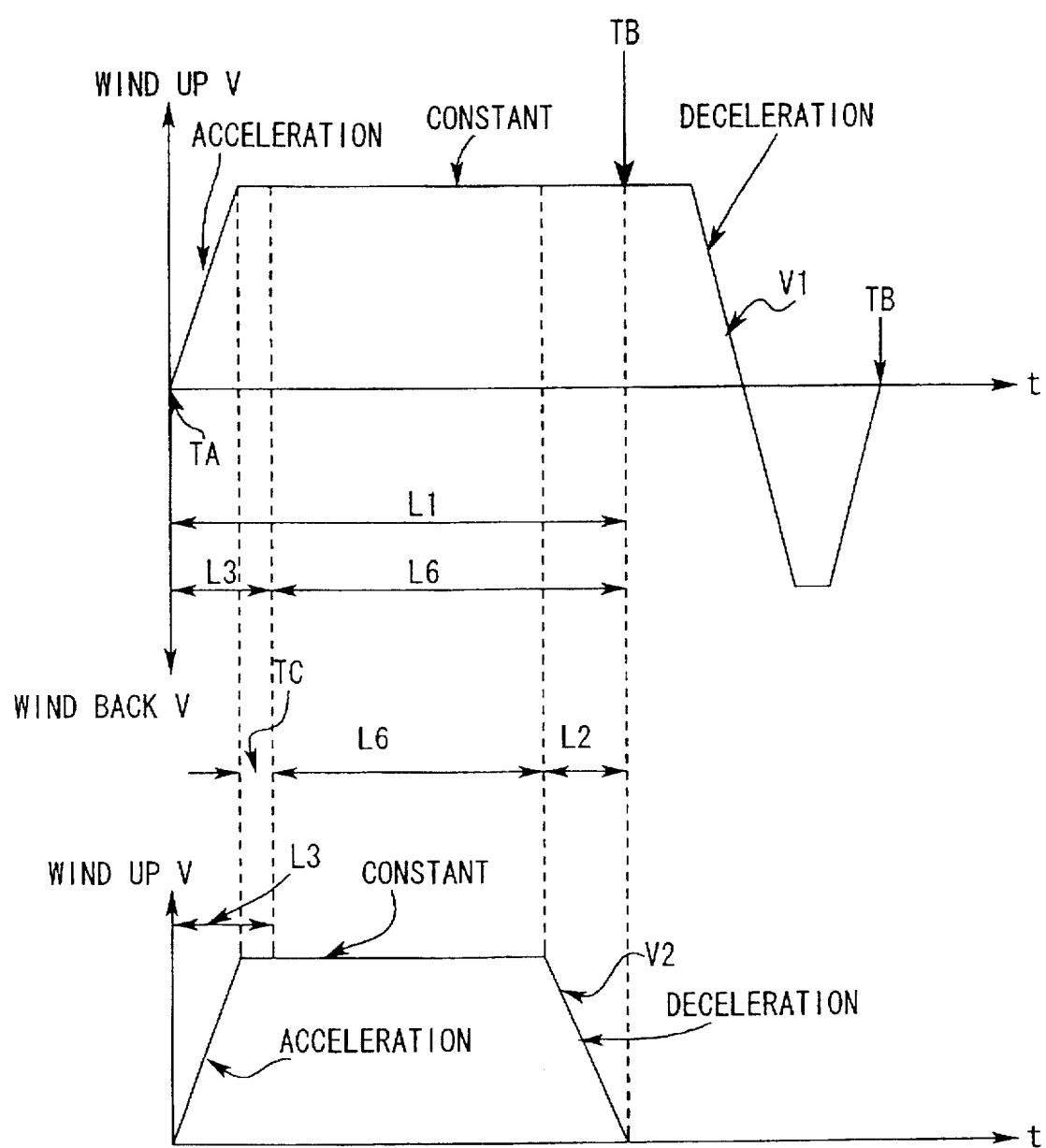
FIG. 15 is a time chart that compares the magnetic recording operation performed in the second embodiment and the magnetic recording operation performed by a camera in the prior art.
Figure 16:
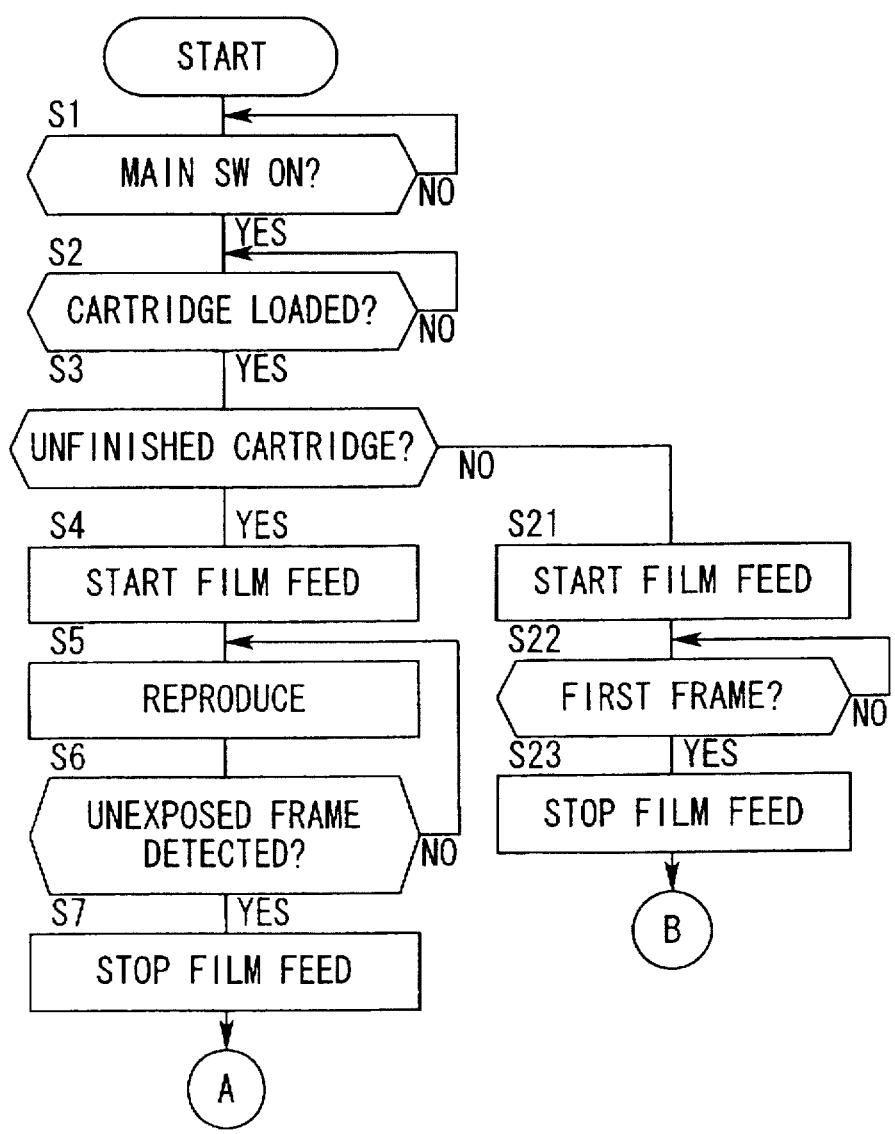
FIGS. 16–21 are a flow chart of the magnetic recording control program in the second embodiment.
Figure 17:
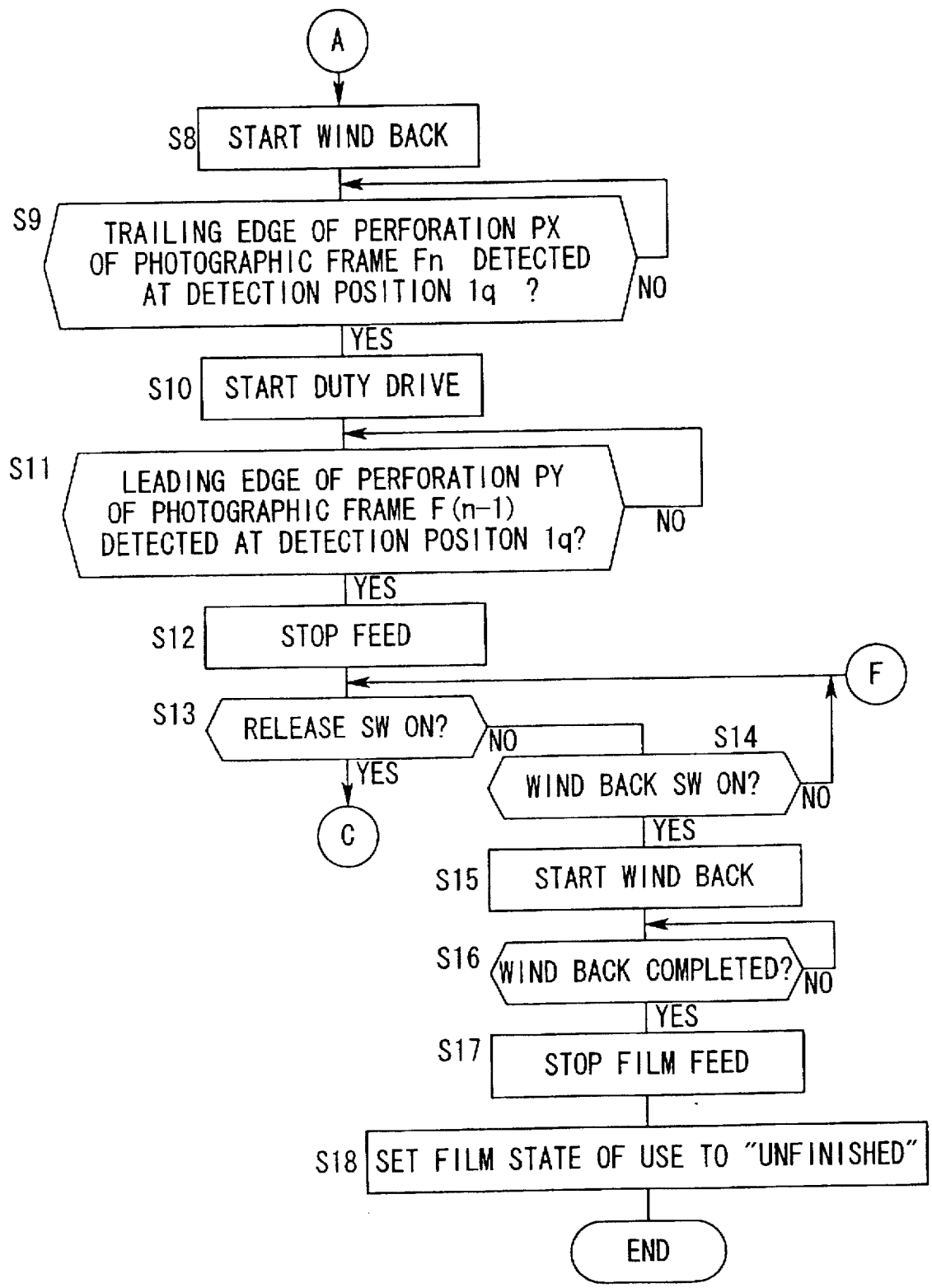
Figure 18:
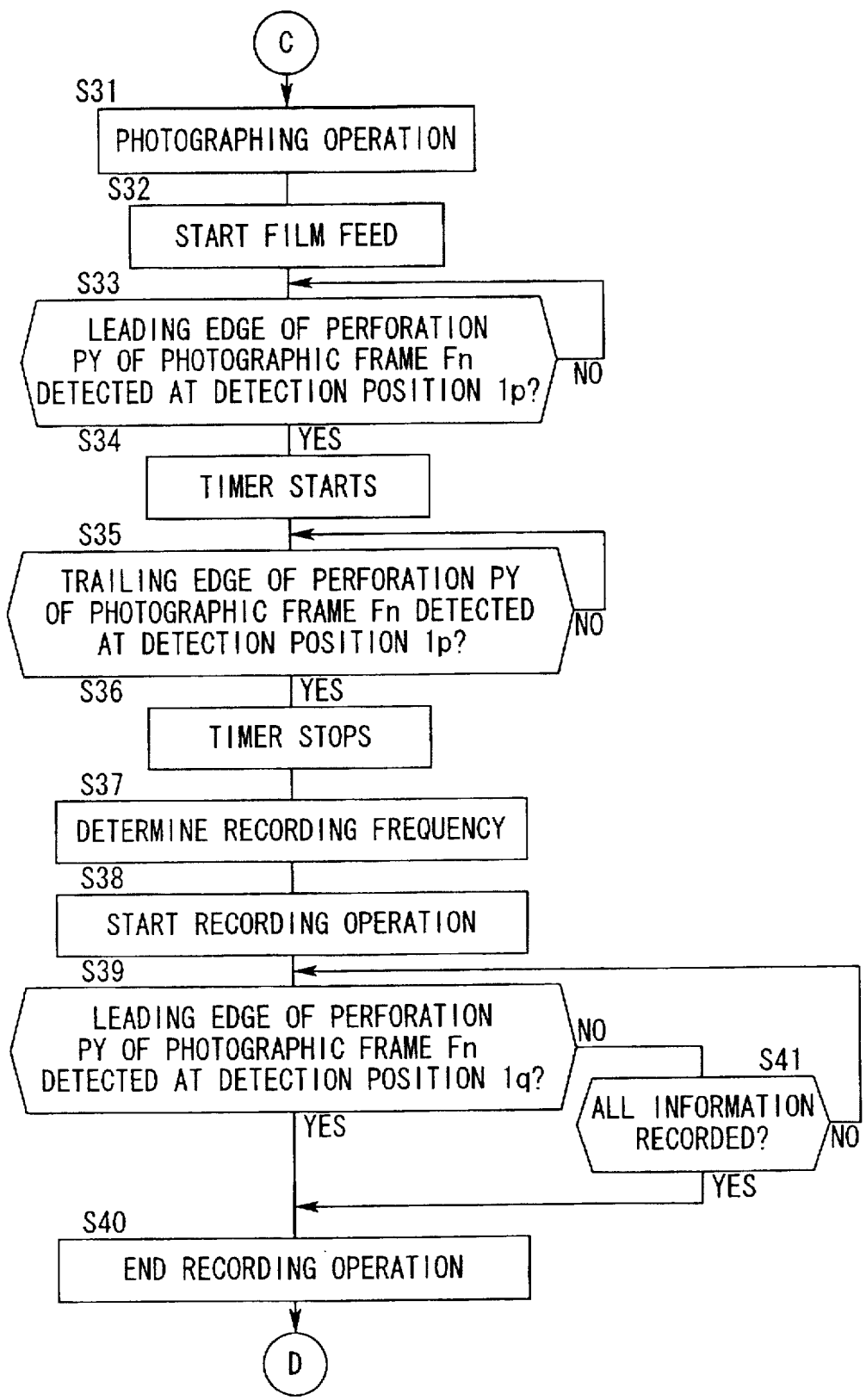
Figure 19:
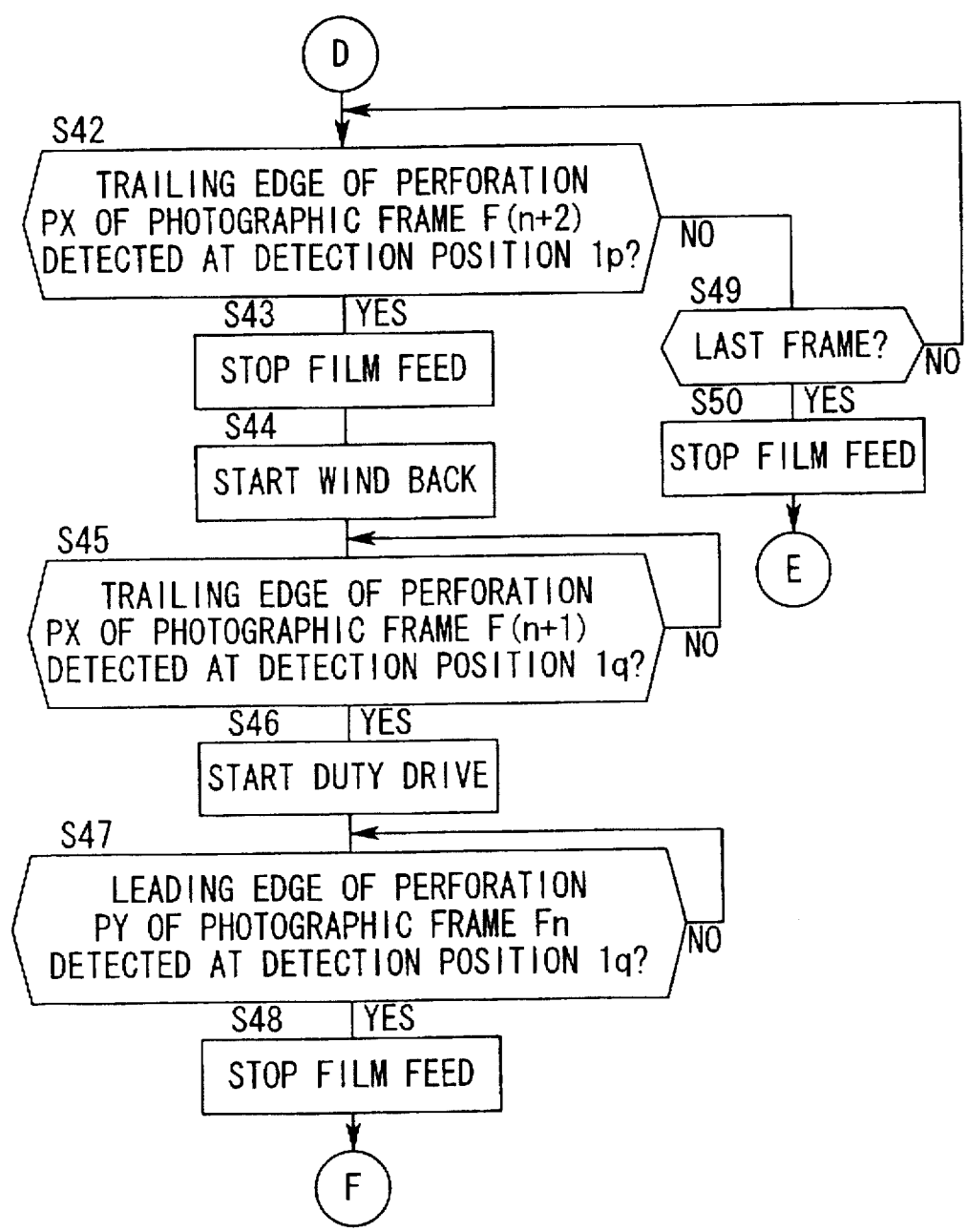
Figure 20:
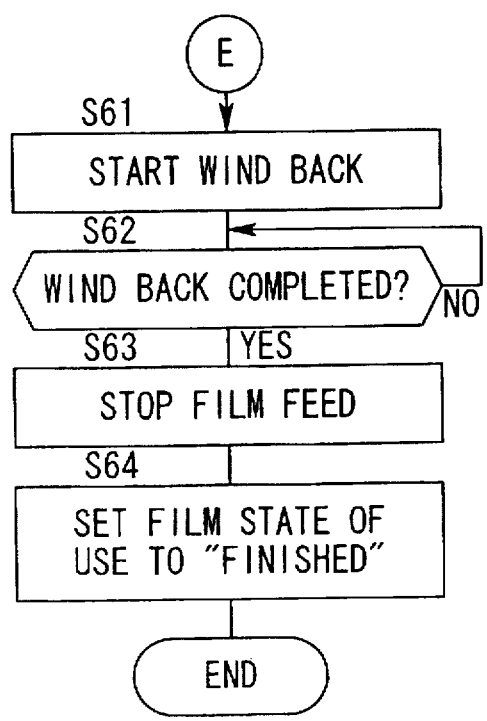
Figure 21:
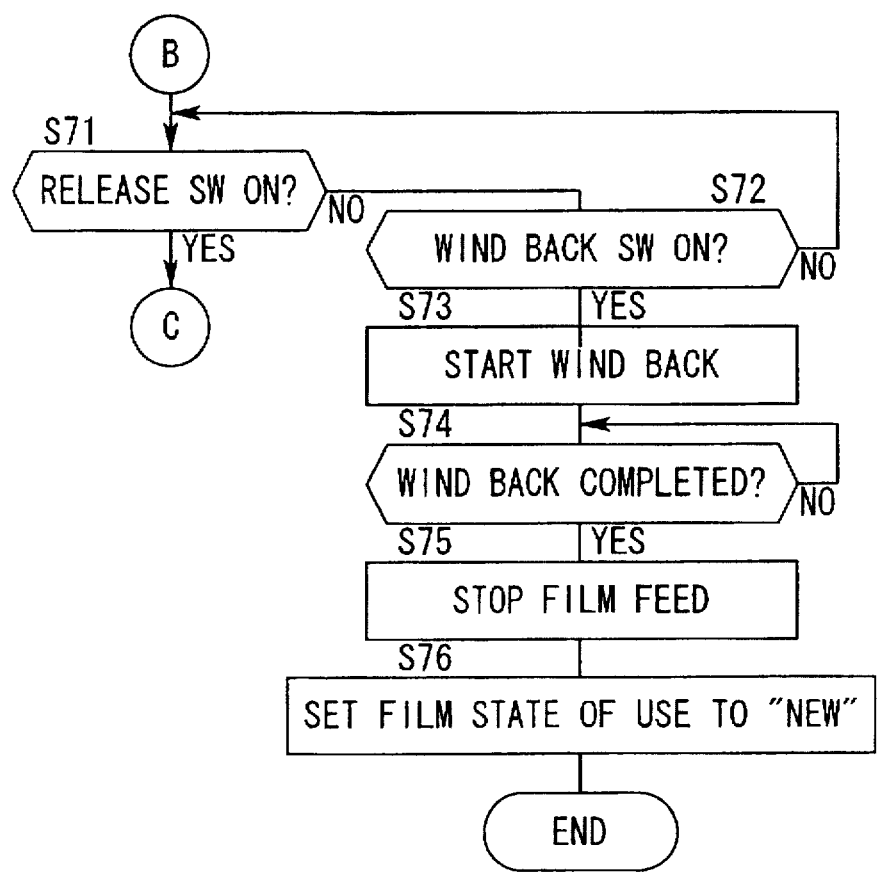

FIG. 15 is a time chart showing the film feed speed after exposure, with V1 representing a case in which the method in this embodiment is used and V2 representing a case in which the prior art method shown in FIGS. 24A–24E is used. In the figure, TA indicates the point in time at which the photographic frame Fn departs from the photographing position and TB indicates the point in time at which the next photographic frame F(n+1) arrives at the photographing position.

As V1 indicates, in this embodiment, when exposure of the photographic frame Fn that is currently at the photographing position is completed, a film feed starts from the time point TA. The film feed state is divided into three stages, i.e., the acceleration stage, the constant speed stage and the deceleration stage. During the acceleration stage and the deceleration stage, the film feed speed changes greatly and therefore, magnetic recording cannot be performed during these periods. During the period TC, immediately after the feed operation shifts from the acceleration stage to the constant speed stage, the film feed speed is detected, the recording frequency that corresponds to this feed speed is determined and magnetic recording is started. The magnetic recording can be performed up to the point in time TB, at which the next photographic frame F(n+1) is set at the photographing position. For some time following the time point TB, film wind up continues at constant speed and then the film wind up stops and wind back is performed until the next photographic frame F(n+1) is set at the photographing position.

As the figure clearly indicates, the length L6 of the magnetic recording area Rn is equal to the difference (L1–L3) obtained by subtracting the film feed quantity L3 during the acceleration stage from the photographic frame interval L1.

Now, as V2 indicates, in the prior art apparatus, the operation proceeds in the same manner as in the embodiment described above after a film feed starts at the time point TA until the magnetic recording starts. The magnetic recording can be performed until the feed speed shifts to the deceleration stage with the start of duty drive of the film feed motor. At the time point TB, when the film feed stops, the next photographic frame F(n+1) is set at the photographing position.

As the figure clearly indicates, the length L6 of the magnetic recording area Rn is equal to the result (L1–L2–L3) obtained by subtracting the film feed quantity L3 during the acceleration stage and the film feed quantity L2 during the deceleration stage from the photographic frame interval L1.

FIGS. 16–21 are a flow chart showing the control program executed by the microcomputer 10 in order to achieve the functions described above. The operation of the embodiment is explained in reference to this flow chart.

When the main switch 5 is turned ON in step S501, the operation proceeds to step S502, in which a decision is made as to whether or not film (the film cartridge, to be more specific) has been loaded and the cartridge chamber has been closed through the switches 11 and 12. If film has been loaded and the cartridge chamber lid is closed, the operation proceeds to step S503, in which a decision is made by the film state of use detection circuit 3 as to whether or not the loaded film is an unfinished film. If it is an unfinished film, the operation proceeds to step S504, while if the film is new, the operation proceeds to step S521. Note that, as mentioned earlier, a cartridge that contains a finished film is structured in such a manner that it is not mechanically possible to load it in the cartridge chamber.

First, the control performed when an unfinished film has been loaded, is explained.

When an unfinished film has been loaded, a motor 9c is driven by controlling the driver 9 in step S504, to start film feed. In step S505, the magnetic head 7a is driven by controlling a reproducing circuit 8 and the photographic information that was recorded in the magnetic recording areas of the individual photographic frames of the film during photographing operation is reproduced. In step S506, a decision is made as to whether or not an unexposed frame has been detected. If there is a photographic frame for which no photographic information is recorded, it is determined that an unexposed frame has been detected, and the operation proceeds to step S507, in which film feed is stopped by drive control through the driver 9 and the motor 9c.

In step S508, film wind back is started by drive control through the driver 9 and motor 9c. Then, in step S509, a decision is made as to whether or not the trailing edge XR of the perforation PX of the photographic frame Fn has reached the detection position 1q of the photo interrupter 1cb. If an affirmative decision is made in step S509, the operation proceeds to step S510, in which duty drive of the motor 9c starts through drive control of the driver 9, to reduce the film feed speed. In step S511, a decision is made as to whether or not the leading edge YF of the perforation PY of the photographic frame F(n−1) has reached the detection position 1q of the photo interrupter 1c and if an affirmative decision is made, the operation proceeds to step S512, in which the driver 9 and the motor 9c are drive controlled to stop film feed.

In step S513, a decision is made through the switch 14 as to whether or not a command for shutter release has been issued. If a shutter release command has been issued, the operation proceeds to step S531, and if not, the operation proceeds to step S514. In step S514, a decision is made through the wind back switch 13 as to whether or not the film wind back button has been operated, and if a film wind back operation has been performed, the operation proceeds to step S515, in which film wind back is started by drive controlling the driver 9 and the motor 9c. In step S516, a decision is made as to whether or not the film wind back has been completed. Decision making as to whether or not wind back has been completed may be performed by providing a film detection switch or the wind back may be determined to be completed when a specific length of time has elapsed after the first photographic frame is wound back.

When the wind back is completed, the operation proceeds to step S517, in which film feed is stopped by drive control through the driver 9 and the motor 9c. In step S518, the actuator 4a is driven by controlling the film state of use setting circuit 4, to set the indicator mechanism for the film cartridge to "unfinished" and then execution of the program ends.

If, on the other hand, it is decided that a shutter release command has been issued in step S513, a sequence of photographing operations, such as photometry, distance measuring finding, aperture and shutter control are performed in step S531, to expose the film. In step S532, film feed is started by drive control through the driver 9 and the motor 9c. In step S533, a decision is made as to whether or not the leading edge YF of the perforation PY of the photographic frame Fn has reached the detection position 1p of the photo interrupter 1a and if an affirmative decision is made, the operation proceeds to step S534, to start the timer. In step S535, a decision is made as to whether or not the trailing edge YR of the perforation PY of the photographic frame Fn has reached the detection position 1p of the photo interrupter 1a and if an affirmative decision is made, the operation proceeds to step S536, to stop the timer. In step S537, the film feed speed is calculated based upon the film feed time, counted on the timer, elapsing from the detection of leading edge YF to detection of the trailing edge YR of the perforation PY and the length of the perforation PY, and then a recording frequency that corresponds to the film feed speed is determined.

In step S538, the magnetic head 7a is driven by controlling the recording circuit 7 to start magnetically recording various types of photographic information. In step S539, a decision is made as to whether or not the leading edge YF of the perforation PY of the photographic frame Fn has reached the detection position 1q of the photo interrupter 1c and if an affirmative decision is made in step S539, the operation proceeds to step S540, to end the recording operation by drive control of the recording circuit 7 and the magnetic head 7a. If, on the other hand, a negative decision is made in step S539, the operation proceeds to step S541, in which a decision is made as to whether or not all the information that should be recorded has been recorded. If all the information that should be recorded has been recorded, the operation proceeds to step S540, to end the recording operation. However, if there is any information that should be recording remaining, the operation returns to step S539.

In step S542, a decision is made as to whether or not the trailing edge XR of the perforation PX of the photographic frame F(n+2) has reached the detection position 1p of the photo interrupter 1a and if an affirmative decision is made, the operation proceeds to step S543, to stop the film feed. In step S544, film wind back is started by drive control through the driver 9 and the motor 9c. In step S545, a decision is made as to whether or not the trailing edge XR of the perforation PX of the photographic frame F(n+1) has reached the detection position 1q of the photo interrupter 1c, and if an affirmative decision is made, the operation proceeds to step S546. In step S546, the duty drive of the motor 9c is started by drive control through the driver 9 to reduce the film feed speed. In step S547, a decision is made as to whether or not the leading edge YF of the perforation PY of the photographic frame Fn has reached the detection position 1q of the photo interrupter 1c and if an affirmative decision is made, the operation proceeds to step S548, in which the film feed is stopped by drive control through the driver 9 and the motor 9c. Then, the operation returns to step S513.

If a negative is made in step S542, the operation proceeds to step S549, in which a decision is made as to whether or not the current photographic frame is the last frame. If it is, film feed is stopped in step S550 before the operation proceeds to step S561. In step S561, film wind back is started by drive control through the driver 9 and the motor 9c. Then, in step S562, a decision is made through the method described above as to whether or not the wind back has been completed. If it has, film feed is stopped by drive control through the driver 9 in step S563. In step S564, the indicator mechanism for the film cartridge is set to "finished" by the actuator 4a through control of the film state of use setting circuit 4, and then the execution of the program ends.

Next, the control performed when a new film has been loaded is explained.

If it is decided in step S503 described above that a new film has been loaded, the film is sent out from the cartridge by drive control through the driver 9 and the motor 9c in the direction of wind up in step S521. In step S522, a decision is made as to whether or not the first frame has been set at the photographing position and if an affirmative decision is made, the operation proceeds to step S523, in which film feed is stopped by drive control through the driver 9 and the motor 9c. Then the operation proceeds to step S571.

In step S571, a decision is made through the switch 14 as to whether or not a command for shutter release has been issued. If a command for shutter release has been issued, the processing performed in step S531 and in subsequent steps described earlier is performed. If, on the other hand, a shutter release command has not been issued, the operation proceeds to step S572, in which a decision is made through the switch 13 as to whether or not the wind back button has been operated. If it has, the operation proceeds to step S573, to start film wind back. In step S574, a decision is made as to whether or not the wind back has been completed. If it has, film feed is stopped in step S575, and then in step S576, the indicator mechanism for the film cartridge is set to "new" with the actuator 4a by control of the film state of use setting circuit 4 before ending the execution of the program.

—Third Embodiment—

While, in the second embodiment, an example in which the length L6 of the magnetic recording area Rn of each photographic frame Fn is (L1−L3) is explained, the length L6 of the magnetic recording area Rn may be equal to the photographic frame interval L1. This third embodiment, in which this is the case, is explained in reference to FIGS. 22A−22F. Note that the lengths of the various portions of the film are the same as those shown in FIG. 12.

Figure 22A:
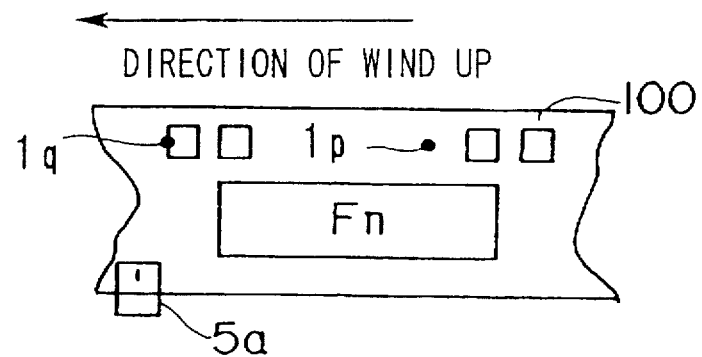
FIGS. 22A–22F illustrate a magnetic recording operation performed in the third embodiment.

In FIGS. 22A−22F, the position of the magnetic head 5a and the timing with which the magnetic recording ends are different from those in the previous embodiment.

(1) FIG. 22A shows a state in which the photographic frame Fn is set at the photographing position. When exposure of the photographic frame Fn is completed in this state, film wind up starts.

Figure 22B:
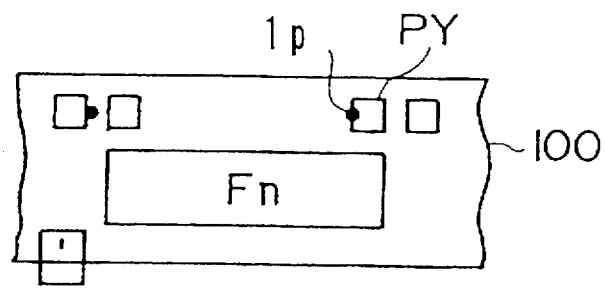
Figure 22C:
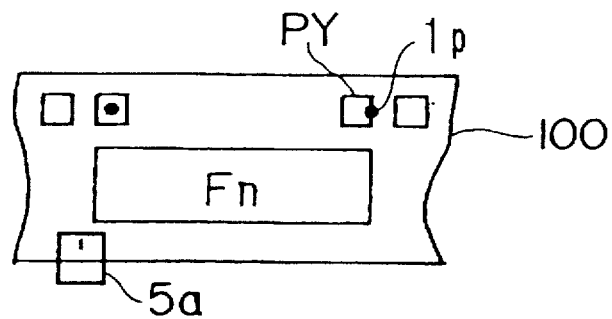

(2) The film feed time elapsing after the leading edge YF of the perforation PY of the photographic frame Fn reaches the detection position 1p of the photo interrupter 1a, as shown in FIG. 22B, until the trailing edge YR reaches the detection position 1p, as shown in FIG. 22C, is counted by a timer. Based upon the distance from the leading edge YF of the perforation PY to the trailing edge YR and the feed time that has elapsed between them, the film feed speed is calculated. In correspondence to the calculated film feed speed, a magnetic recording frequency that will achieve a specific magnetic recording density is calculated and magnetic recording is started by the magnetic head 7a.

Figure 22D:
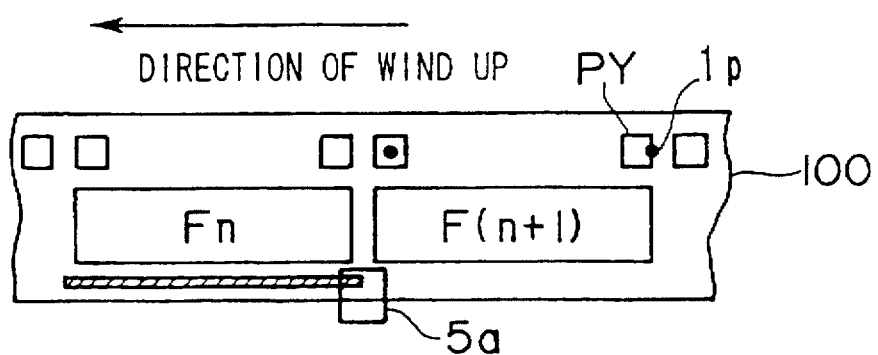

(3) When the trailing edge YR of the perforation PY of the photographic frame F(n+1) reaches the detection position 1p of the photo interrupter 1a, as shown in FIG. 22D, the magnetic recording ends.

Figure 22E:
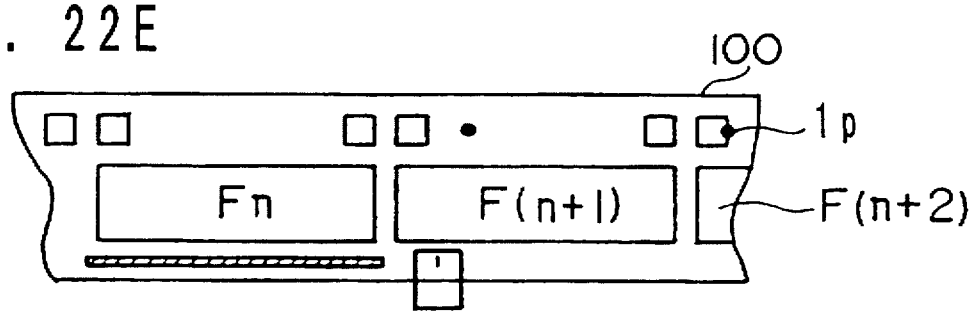

(4) The film is further wound up and when the trailing edge XR of the perforation PX of the photographic frame F(n+2) reaches the detection position 1p of the photo interrupter 1a, as shown in FIG. 22E, film wind up stops and wind back starts.

Figure 22F:
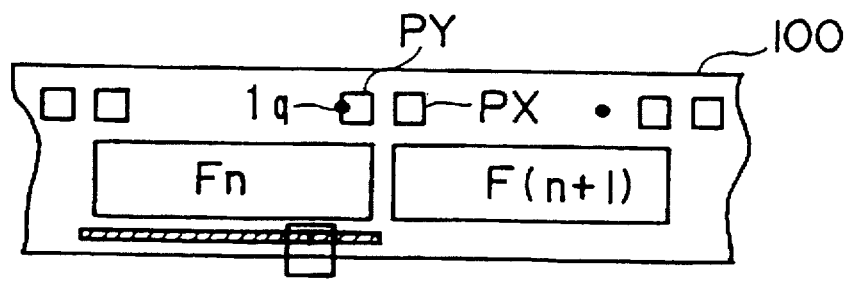

(5) After the wind back starts, when the trailing edge XR of the perforation PX of the photographic frame F(n+1) reaches the detection position 1q of the photo interrupter 1c, duty drive of the film feed motor starts, to reduce the feed speed. Then, when the leading edge YF of the perforation PY of the photographic frame Fn reaches the detection position 1q, as shown in FIG. 22F, film feed stops. Now, the length L6 of the magnetic recording area Rn in this embodiment, shown in FIGS. 22A−22F, is examined.

The quantity of film fed after film feed starts following exposure, until magnetic recording starts (FIGS. 22A−22C) is L3. Thus, $$L5 = L3 - L4.$$

Since, in this embodiment, the magnetic recording area is set over the entire width of the photographic frame interval L1, the position at which magnetic recording starts must be at the border CX and the position at which magnetic recording ends must be at the border CY. Therefore, the distance L5 between the border CX and the magnetic recording start position must be 0. Consequently:

$$L5 = L3 - L4 = 0.$$

Thus, $$L3 = L4.$$

In other words, magnetic recording can be performed starting at the border CX if the magnetic head 5a is set at the position where L3=L4, and the magnetic recording is started at the point in time when the trailing edge YR of the perforation PY of the photographic frame Fn reaches the detection position 1p, as described earlier. Now, if the magnetic head 5a is set at this position, the magnetic head 5a will be positioned at the border CY when the trailing edge YR of the perforation PY of the frame F(n+1) reaches the detection position 1p. Thus, by ending the magnetic recording at this point, it becomes possible to perform magnetic recording from CX to CY. In short, the length L6 of the magnetic recording area Rn becomes equal to the photographic frame interval L1.

Note that, while thus far, two examples in which the length L6 of the magnetic recording area Rn is either (L1−L3) or L1 have been explained, the length L6 of the magnetic recording area Rn and its positional relationship with each photographic frame can be freely set by changing the magnetic recording start timing, the magnetic recording end timing, the position of the magnetic head, the detection positions of the photo interrupters and the like. In addition, even when there is a restriction on the installation position of the magnetic head, the magnetic recording area can be set at a desirable length without reducing it, by changing the magnetic recording start timing, the magnetic recording end timing, the detection positions of the photo interrupters and the like.

—Fourth Embodiment—

While the second and the third embodiments employ two sets of perforation detection circuits and photo interrupters, a magnetic recording area with the same length can be set with one set of perforation detection circuit and photo interrupter. The fourth embodiment, which achieves this, is explained in reference to FIGS. 23A−23F. Of the pair of photo interrupters described earlier, only the photo interrupter 1c positioned at the detection position 1q is used in this embodiment.

(1) FIG. 23A shows a state in which the photographic frame Fn is set at the photographing position. When exposure of the photographic frame Fn is completed at this position, film wind up starts.

Figure 23B:
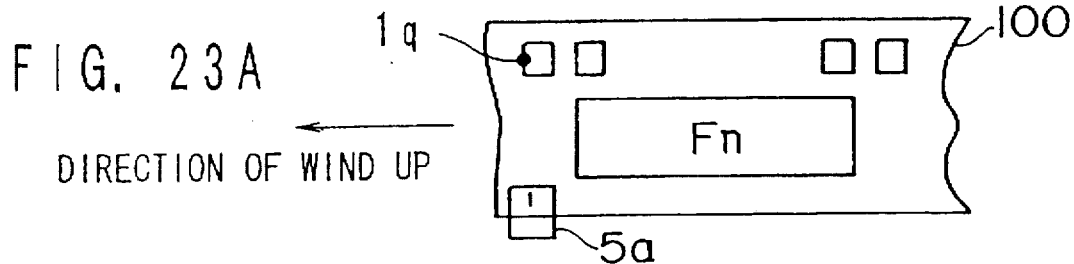
Figure 23B:
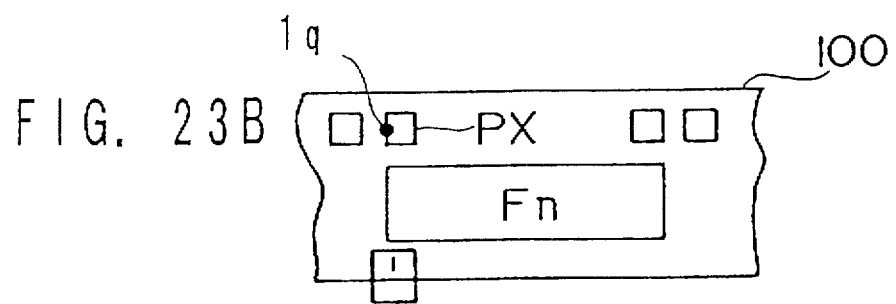
Figure 23C:
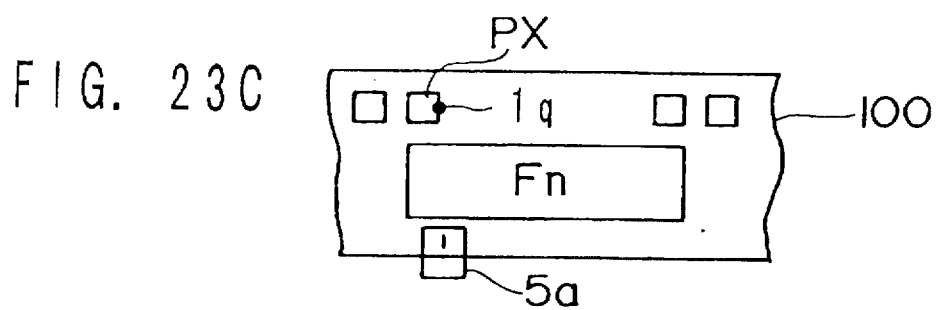

(2) The film feed time elapsing after the leading edge XF of the perforation PX of the photographic frame Fn reaches the detection position 1q of the photo interrupter 1c, as shown in FIG. 23B, until the trailing edge XR reaches the detection position 1q, as shown in FIG. 23C, is counted by a timer. Based upon the distance from the leading edge XF of the perforation PX to the trailing edge XR and the feed time that has elapsed between them, the film feed speed is calculated. In correspondence to the calculated film feed speed, a magnetic recording frequency that will achieve a specific magnetic recording density is calculated and magnetic recording is started by the magnetic head 7a.

Figure 23D:
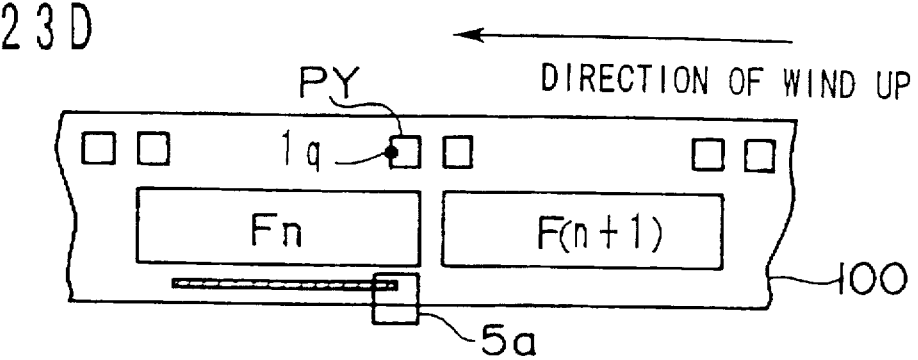
Figure 23E:
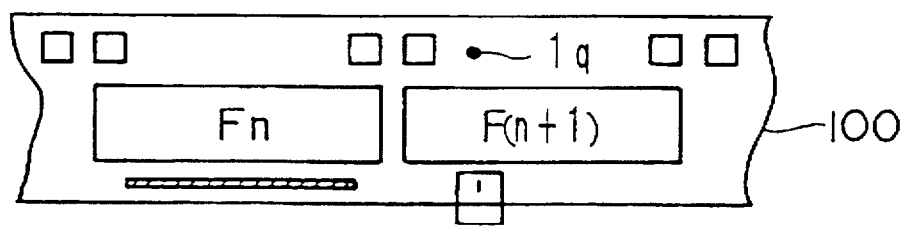

(3) When the leading edge YF of the perforation PY of the photographic frame Fn reaches the detection position 1q of the photo interrupter 1c, as shown in FIG. 23D, magnetic recording ends.

(4) The film is further wound up and when a specific length of time has elapsed after the leading edge YF of the perforation PY of the photographic frame Fn reaches the detection position 1q of the photo interrupter 1c, as shown in FIG. 23D, film feed stops and wind back starts.

Figure 23F:
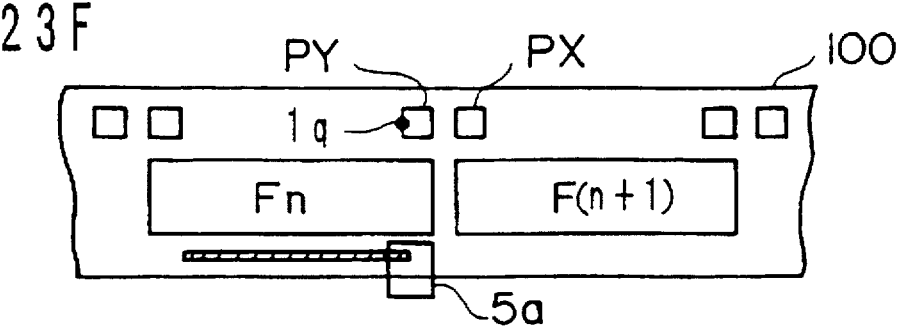

(5) After the wind back starts, when the trailing edge XR of the perforation PX of the photographic frame F(n+1)

reaches the detection position 1q of the photo interrupter 1c, duty drive of the film feed motor starts, to reduce the feed speed. Then, when the leading edge YF of the perforation PY of the photographic frame Fn reaches the detection position 1q, as shown in FIG. 23F, film feed stops. Thus, even when only one photo interrupter is used, the length of the magnetic recording area can be set at (L1-L3). However, in this case, the recording start position will be subject to restrictions.

While the embodiments above have been explained for a so-called normal wind up type camera, which performs exposure winding up the film from the cartridge into the camera one frame at a time, the present invention may be applied to the so-called prewind type camera, which winds up the entire film into the camera prior to photographing and performs exposure winding back the film into the cartridge one frame at a time. In the latter case, the detection positions of the photo interrupters and the installation position of the magnetic head must be changed to positions that are symmetrical relative to the photographic frame and also, part of the control program shown in FIGS. 16-21 must be changed for the prewind method.

Note that, while all the embodiments described above are presented as film feed control apparatuses for a camera for purposes of explanation, the present invention can be applied to film feed control apparatuses used in devices other than cameras, i.e., devices that project photographic images on film on to TV screens and other devices into which film can be loaded.

We claim:

1. An apparatus capable of frame feed operation, in which a photographic film is fed in a specific direction when a given photographic frame of said photographic film is being set at a specific position, and said photographic film is stopped when a next photographic frame is set at said specific position, said apparatus comprising:
    a feed device that feeds said photographic film;
    a position detection device that detects that a given photographic frame is set at said specific position while said photographic film is being fed, to output a frame set signal;
    an unexposed frame detection device that, while said photographic film is being fed in said specific direction, detects whether a photographic frame departing from said specific position is an unexposed frame or an exposed frame and outputs an unexposed frame detection signal if said photographic frame is an unexposed frame; and
    a control device that controls said feed device in such a manner that, when unfinished film that includes exposed frames and unexposed frames is loaded, said unfinished film is fed in said specific direction, which is the same as the direction of film feed during said frame feed operation, said film feed in said specific direction continues after said unexposed frame detection signal is output, skipping an unexposed frame, and then said film feed is stopped when said frame set signal is output after said unexposed frame detection signal is output.

2. An apparatus according to claim 1, further comprising:
    an indicator device that indicates film states of use, and
    an indicator control device that, when said unfinished film that has been loaded is to be taken out while an unexposed frame remains, controls said indicator device to indicate that said unfinished film to be taken out is a finished film, all photographic frames thereof are exposed.

3. An apparatus according to claim 1, wherein:
    said unexposed frame detection device includes a reproduction device that reproduces information from a recording area corresponding to each frame of said photographic film, said information indicating whether or not said frame has been exposed.

4. An apparatus according to claim 5, further comprising:
    a recording device that records information in said recording area corresponding to said each frame of said photographic film during said film feed, said information indicating whether or not said frame has been exposed; and
    a recording control device that controls said recording device in such a manner that information indicating that exposure has been performed is recorded for exposed frames and said skipped unexposed frame.

5. An apparatus according to claim 1, wherein said apparatus is a camera.

6. An apparatus capable of frame feed operation, in which a photographic film is fed in a specific direction when a given photographic frame of said photographic film is being set at a specific position, and said photographic film is stopped when a next photographic frame is set at said specific position, comprising:
    a feed device that feeds said photographic film,
    a position detection device that detects that a given photographic frame is set at said specific position while said photographic film is being fed, to output a frame set signal,
    an unexposed frame detection device that, while said photographic film is being fed in said specific direction, detects whether a photographic frame departing from said specific position is an unexposed frame or an exposed frame and outputs an unexposed frame detection signal if said photographic frame is said unexposed frame, and
    a control device that controls said feed device in such a manner that, (a) when an unfinished film, which includes exposed frames and unexposed frames, is loaded, said unfinished film is fed in said specific direction, which is the same as the direction of film feed during said frame feed operation, (b) in response to an output of said unexposed frame detection signal, said unfinished film is fed in a direction opposite from said specific direction until the unexposed frame that has been passing said specific position during a film feed operation in said specific direction passes said specific position during a film feed operation in said direction opposite from said specific direction, (c) thereafter said unfinished film is fed in said specific direction again, and said film feed stops when said frame set signal is output.

7. An apparatus according to claim 6, wherein said apparatus is a camera.

8. An apparatus capable of frame feed operation, in which a photographic film is fed in a specific direction when a given photographic frame of said photographic film is being set at a specific position, and said photographic film is stopped when a next photographic frame is set at said specific position, comprising:
    a feed device that feeds said photographic film,
    a position detection device that detects that a given photographic frame is set at said specific position while said photographic film is being fed, to output a frame set signal,
    an unexposed frame detection device that, while said photographic film is being fed in said specific direction, detects whether a photographic frame departing from said specific position is an unexposed frame or an exposed frame and outputs an unexposed frame detection signal if said photographic frame is said unexposed frame, and a control device that controls said feed device in such a manner that, when an unfinished film, which includes exposed frames and unexposed frames, is loaded, (a) under a first condition, said unfinished film is fed in said specific direction, which is the same as the direction of film feed during said frame feed operation, said film feed in said specific direction continues after said unexposed frame detection signal is output and said film feed is stopped when said frame set signal is output after said unexposed frame detection signal is output, and (b) under a second condition, said unfinished film is fed in said specific direction, which is the same as the direction of film feed during said frame feed operation, said unfinished film is fed in a direction opposite from said specific direction by one frame or more in response to an output of said unexposed frame detection signal, thereafter said unfinished film is fed in said specific direction again, and said film feed stops when said frame set signal is output.

9. An apparatus according to claim 8, wherein:

said first condition is that a number of said unexposed frame of said unfinished film is equal to or exceeds a specific number and said second condition is that said number of said unexposed frame of said unfinished film is lower than said specific number.

10. An apparatus according to claim 8, wherein said apparatus is a camera.

11. An apparatus that feeds a photographic film in a specific direction with recording information on said photographic film, to set a specific portion of said photographic film at a specific position apart from a position at which information recording is started, comprising:

feed device that feeds said photographic film, recording device that records information on said photographic film during film feed, and control device that controls said feed device and said recording device in such a manner that said photographic film is fed in said specific direction, said information is recorded on said photographic film in synchronization with said film feed, said film feed in said specific direction and information recording continue even after said specific portion of said photographic film reaches said specific position, thereafter the film feed and the information recording stop, and the photographic film is fed in a direction opposite from said specific direction and said photographic film stops when said specific portion reaches said specific position.

12. A film feed control apparatus according to claim 10, wherein;

said control device controls said feed device and said recording device in such a manner that said film feed in said specific direction starts when a given frame of said photographic film is being set at said specific position, and said information is recorded on said photographic film in synchronization with said film feed, said film feed in said specific direction continues even after a next frame reaches said specific position, thereafter said photographic film is fed in said direction opposite from said specific direction and said photographic film stops when said next frame is set at said specific position.

13. An apparatus according to claim 12, wherein:

said control device controls said recording device in such a manner that, after said film feed in said specific direction starts, said recording of said information continues even after said next frame reaches said specific position.

14. An apparatus according to claim 10, wherein:

said recording device is a magnetic recording device that records information in a magnetic recording area provided in correspondence to each frame of said photographic film.

15. An apparatus according to claim 14, further comprising:

a speed detection device that detects film feed speed during said film feed, and a calculation device that calculates a recording frequency for magnetic recording based upon said film feed speed thus detected wherein;

said control device controls said feed device, said speed detection device, said calculation device and said recording device in such a manner that said film feed in said specific direction starts when a given frame of said photographic film is being set at said specific position, then detection of film feed speed, calculation of said recording frequency, and magnetic information recording at said recording frequency thus calculated are performed, said film feed in said specific direction continues after a next frame reaches said specific position, thereafter the film feed and the information recording stop, and said photographic film is fed in the direction that is opposite from said specific direction and said photographic film stops when said next frame is set at said specific position.

16. An apparatus according to claim 15, wherein:

said control device controls said recording device in such a manner that, after said film feed in said specific direction starts, recording of said information continues even after said next frame reaches said specific position.

17. An apparatus according to claim 11, wherein said apparatus is a camera.

\* \* \* \* \*